United States Patent
Lee

(10) Patent No.: US 11,157,210 B2
(45) Date of Patent: Oct. 26, 2021

(54) MEMORY SYSTEM PERFORMING DUMMY PROGRAM OPERATION DURING NORMAL PROGRAM OPERATION

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 34 days.

(21) Appl. No.: 16/700,776

(22) Filed: Dec. 2, 2019

(65) Prior Publication Data

US 2020/0174704 A1 Jun. 4, 2020

(30) Foreign Application Priority Data

Dec. 3, 2018 (KR) .................. 10-2018-0153626

(51) Int. Cl.
*G06F 3/06* (2006.01)

(52) U.S. Cl.
CPC ............ *G06F 3/0659* (2013.01); *G06F 3/064* (2013.01); *G06F 3/0604* (2013.01); *G06F 3/0652* (2013.01); *G06F 3/0673* (2013.01); *G06F 3/0679* (2013.01)

(58) Field of Classification Search
CPC ...... G06F 3/0659; G06F 3/0604; G06F 3/064; G06F 3/0673
See application file for complete search history.

(56) References Cited

U.S. PATENT DOCUMENTS

| | | | |
|---|---|---|---|
| 6,661,711 B2 | 12/2003 | Pan et al. | |
| 2014/0013031 A1* | 1/2014 | Masuo | G06F 12/00 |
| | | | 711/103 |
| 2014/0029341 A1* | 1/2014 | In | G11C 11/5628 |
| | | | 365/185.12 |
| 2014/0032817 A1* | 1/2014 | Bux | G06F 12/0261 |
| | | | 711/103 |
| 2015/0332770 A1* | 11/2015 | Kim | G11C 16/0483 |
| | | | 365/185.12 |
| 2018/0358098 A1* | 12/2018 | Cha | G11C 16/10 |
| 2020/0051621 A1* | 2/2020 | Papandreou | G06F 3/0659 |

FOREIGN PATENT DOCUMENTS

| | | |
|---|---|---|
| KR | 10-1999-0080740 | 11/1999 |
| KR | 10-2015-0047394 | 5/2015 |
| KR | 10-2015-0130638 | 11/2015 |
| KR | 10-2016-0044989 | 4/2016 |
| KR | 10-2016-0073873 | 6/2016 |
| KR | 10-2016-0096082 | 8/2016 |

\* cited by examiner

*Primary Examiner* — Andrew J Cheong
(74) *Attorney, Agent, or Firm* — IP & T Group LLP

(57) ABSTRACT

A method for operating a memory system including a memory device having a plurality of memory elements and a controller coupled to the plurality of memory elements through a plurality of different channels, the method comprising: calculating the number of dummy pages in partially closed blocks in the plurality of memory elements; generating at least one dummy page group by grouping the dummy pages based on a dummy page count; and performing a dummy program operation on the at least one dummy page group while a normal program operation may be performed.

23 Claims, 19 Drawing Sheets

| Page 8 | Page 8 | Page 8 |
|--------|--------|--------|
| Page 7 | Page 7 | Page 7 |
| Page 6 | Page 6 | Page 6 |
| Page 5 | Page 5 | Page 5 |
| Page 4 | Page 4 | Page 4 |
| Page 3 | Page 3 | Page 3 |
| Page 2 | Page 2 | Page 2 |
| Page 1 | Page 1 | Page 1 |
| Page 0 | Page 0 | Page 0 |

☐ Erase Page

MEMORY SYSTEM PERFORMING DUMMY PROGRAM OPERATION DURING NORMAL PROGRAM OPERATION

CROSS-REFERENCE TO RELATED APPLICATION

This patent application claims priority under 35 U.S.C. § 119(a) to Korean Patent Application No. 10-2018-0153626, filed on Dec. 3, 2018, the entire disclosure of which is incorporated herein by reference.

BACKGROUND

1. Field

Various embodiments of the present invention relate to a memory system and a method for operating a memory system, and more particularly, to a memory system, a controller, and a method for operating the memory system.

2. Description of the Related Art

Recently, the paradigm for a computing environment has shifted to ubiquitous computing, which enables computer systems to be accessed virtually anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), has high data access speed, and low power consumption. In the context of a memory system having such advantages, an exemplary data storage device includes a USB (Universal Serial Bus) memory device, a memory card having various interfaces, a solid state drive (SSD) or the like.

SUMMARY

Embodiments of the present invention are directed to a memory system that may improve the performance and reliability of the memory device.

Embodiments of the present invention are directed to a memory system that may improve the efficiency of a dummy program operation.

Embodiments of the present invention are directed to a memory system that may reduce overhead.

According to an embodiment of the present invention, a method for operating a memory system including a memory device having a plurality of memory elements and a controller coupled to the plurality of memory elements through a plurality of different channels, the method comprising: calculating the number of dummy pages in partially closed blocks in the plurality of memory elements; generating at least one dummy page group by grouping the dummy pages based on a dummy page count; and performing a dummy program operation on the at least one dummy page group while a normal program operation may be performed.

The normal program operation may include a user data program operation, a metadata program operation, a data flushing operation or a copy operation of valid data. The dummy program operation may be performed in at least one of the plurality of memory elements that may be in an idle state in which the normal program operation or a read operation may be not being performed. The dummy program operation may be performed in at least one of the memory elements coupled to the channel that may be in an idle state in which data may be not transmitted. The calculating the number of dummy pages may be performed while the memory device may be in an idle state. The dummy page count may be determined based on at least one of the number of the dummy pages, a reduction rate of valid pages in the memory die, the number of a free blocks among memory blocks in the memory device or a time taken for a normal program operation. The dummy page group may include dummy pages that have the same page offset and may be in different partially closed blocks. The different partially closed blocks may be coupled to the controller through the plurality of different channels. The dummy page group may include the dummy pages that have different page offsets and may be in the same partially closed block. The method may further comprise performing an erase operation on the partially closed blocks in which the dummy program operation may be performed. The calculating the number of dummy pages may be performed after a write request may be received from a host. The dummy page may include an erase page. The dummy page may include a boundary page and an erase page. The calculating of the number of the dummy pages may include: searching for the boundary page in each of the partially closed blocks and at least one erase page which may be physically consecutive to at least one of the boundary pages found based on boundary page information of the partially closed blocks; and calculating the number of boundary pages found in the searching operation and erase pages located.

According to an embodiment of the present invention, a memory system comprising: a memory device including a plurality of memory elements each having a plurality of pages; and a controller coupled to the plurality of memory elements through a plurality of different channels, wherein the controller calculates the number of dummy pages in partially closed blocks in the plurality of memory elements and generates at least one dummy page group by grouping the dummy pages based on a dummy page count, wherein the controller performs a dummy program operation on the at least one dummy page group while a normal program operation may be performed.

The normal program operation may include a user data program operation, a metadata program operation, a data flushing operation or a copy operation of valid data. The dummy program operation may be performed in at least one of the plurality of memory elements that may be in an idle state in which the normal program operation or a read operation may be not being performed. The dummy program operation may be performed in at least one of the memory elements coupled to the channel that may be in an idle state in which data may be not transmitted. The controller generates the at least one dummy page group while the memory device may be in an idle state. The controller generates the at least one dummy page group when a write request with a user data may be received from a host. The dummy page count may be determined based on at least one of the number of the dummy pages, a reduction rate of valid pages in the memory die, the number of a free blocks among memory blocks in the memory device or a time taken for a normal program operation. The dummy page group may include dummy pages that have the same page offset and may be in different partially closed blocks. The different partially closed blocks may be coupled to the controller through the plurality of different channels. The dummy page group may include the dummy pages that have different page offsets and may be in the same partially closed block. The controller performs an erase operation on the partially closed blocks in which the dummy program operation may be performed. The controller generates the at least one dummy page group when a write request with user data may be received from a host. The dummy page may include an erase page. The dummy page may include a boundary page and an erase page.

According to an embodiment of the present invention, a method for operating a memory system including a memory device and a controller configured to control the memory device, the method comprising: identifying, in response to a specific event, a boundary page of a partially closed memory element in the memory device and at least one erase page that may be adjacent to the boundary page based on boundary page information generated as a result of the specific event, the boundary page separating the at least one erase page adjacent thereto from a normal program page in the partially closed memory element; performing a dummy program operation on the boundary page and the at least one erase page when the partially closed memory element may be in an idle state; and performing an erase operation on the partially closed memory element after performing the dummy program operation.

DETAILED DESCRIPTION

Figure 1:
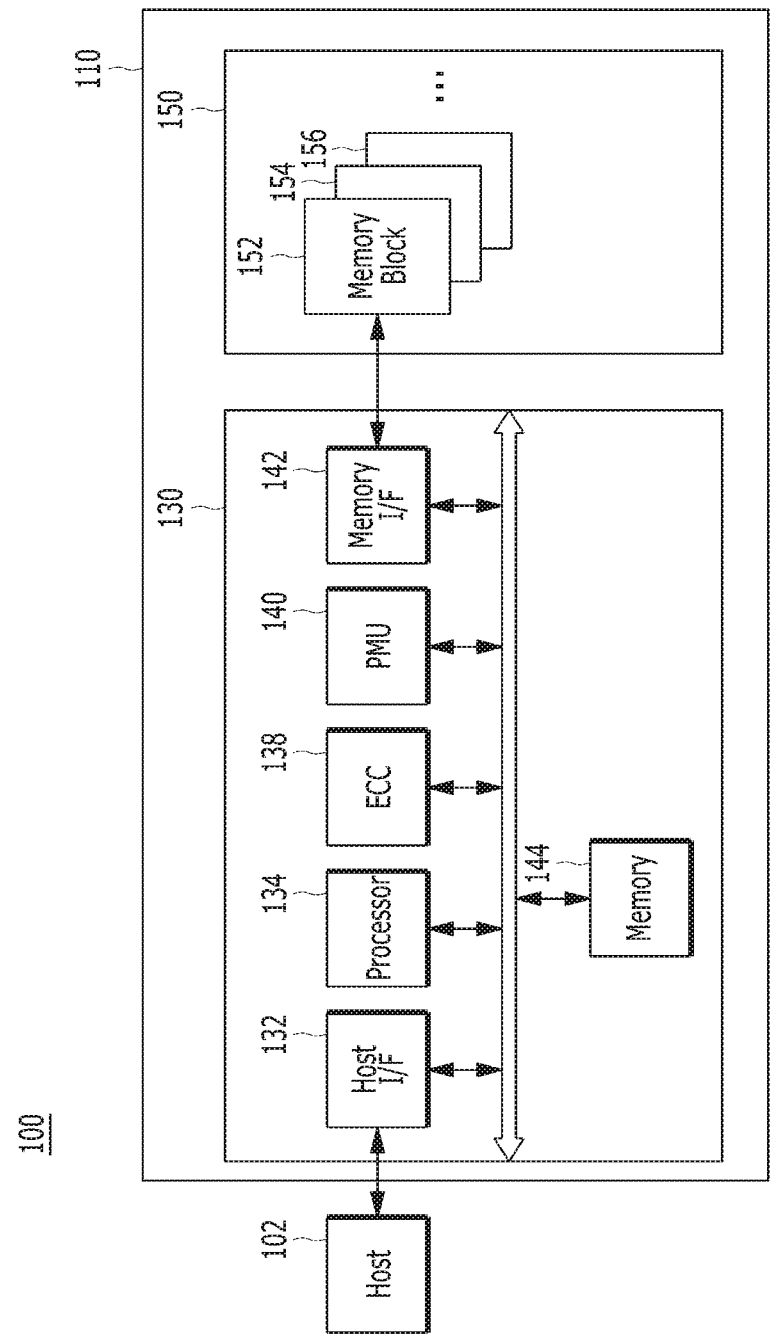
FIG. 1 is a block diagram illustrating a data processing system including a memory system according to an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

FIG. 1 is a block diagram illustrating a data processing system 100 according to an embodiment of the present invention.

Referring to FIG. 1, the data processing system 100 may include a host 102 operably engaged with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage and control, functions and operations performed in the host 102. The OS can provide interoperability between the host 102 engaged with the memory system 110 and the user using the memory system 110. The OS may support functions and operations corresponding to user's requests. By way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include and execute multiple operating systems in cooperation with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described below with reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive(SSD), a multimedia card(MMC), an embedded MMC(eMMC), a reduced size MMC(RS-MMC), a micro-MMC, a secure digital(SD) card, a mini-SD, a micro-SD, a universal serial bus(USB) storage device, a universal flash storage(UFS) device, a compact flash(CF) card, a smart media(SM) card, a memory stick, and the like.

The storage devices for the memory system 110 may be implemented with a volatile memory device, for example, a dynamic random access memory (DRAM) and/or a static RAM (SRAM), and/or a nonvolatile memory device such as a read only memory(ROM), a mask ROM(MROM), a programmable ROM(PROM), an erasable programmable ROM(EPROM), an electrically erasable programmable ROM(EEPROM), a ferroelectric RAM(FRAM), a phase-change RAM(PRAM), a magneto-resistive RAM(MRAM), a resistive RAM(RRAM or ReRAM) and/or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems as exemplified above.

By way of example but not limitation, the controller 130 and the memory device 150 may be integrated into a single semiconductor device. The controller 130 and memory device 150 may be so integrated into an SSD to improve operation speed. When the memory system 110 is used as an SSD, the operating speed of the host 102 connected to the memory system 110 can be improved more than that of the host 102 implemented with a hard disk. In addition, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC-micro), a SD card (SD, miniSD, microSD, SDHC), a universal flash memory or the like.

The memory system 110 may be configured as a part of, for example, a computer, an ultra-mobile PC(UMPC), a workstation, a net-book, a personal digital assistant(PDA), a portable computer, a web tablet, a tablet computer, a wireless phone, a mobile phone, a smart phone, an e-book, a portable multimedia player(PMP), a portable game player, a navigation system, a black box, a digital camera, a digital multimedia broadcasting(DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification(RFID) device, or one of various components configuring a computing system.

The memory device 150 may be a nonvolatile memory device and may retain data stored therein even when electrical power is not supplied. The memory device 150 may store data provided from the host 102 through a program operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program, and erase operations. For example, the controller 130 may control the memory device 150 in response to a request from the host 102. The controller 130 may provide the data, read from the memory device 150, to the host 102. The controller 130 may store the data, provided by the host 102, into the memory device 150.

The controller 130 may include a host interface (I/F) 132, a processor 134, an error correction code (ECC) component 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus(USB), multimedia card(MMC), peripheral component interconnect-express(PCI-e or PCIe), small computer system interface(SCSI), serial-attached SCSI(SAS), serial advanced technology attachment(SATA), parallel advanced technology attachment(PATA), small computer system interface(SCSI), enhanced small disk interface(ESDI) and/or integrated drive electronics(IDE). According to an embodiment, the host interface 132 is a component for exchanging data with the host 102, which may be implemented through firmware called a host interface layer (HIL).

The ECC component 138 can correct error bits of the data to be processed in and outputted from the memory device 150. The ECC component 138 may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in data read from the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit generated during the ECC encoding process, for correcting error bit(s) of the read data. When the number of error bits is greater than or equal to a threshold number of correctable error bits, the ECC component 138 may not correct error bits but instead may output an error correction fail signal indicating failure in correcting the error bits.

The ECC component 138 may perform an error correction operation based on a coded modulation such as a low density parity check(LDPC) code, a Bose-Chaudhuri-Hocquenghem (BCH) code, a turbo code, a Reed-Solomon(RS) code, a convolution code, a recursive systematic code(RSC), a trellis-coded modulation(TCM), and/or a Block coded modulation(BCM). The ECC component 138 may include any and all circuits, modules, systems or devices for performing the error correction operation based on at least one of the above described codes.

The PMU 140 may manage, control or provide electrical power in the controller 130.

The memory interface 142 may serve as an interface for handling commands and data transmitted between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. According to an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data which occurs or is delivered for operations in the memory system 110 and the controller 130. The controller 130 may control the memory device 150 in response to a request from the host 102. The controller 130 may deliver data read from the memory device 150 to the host 102. The controller 130 may store data entered through the host 102 in the memory device 150. The memory 144 may be used to store data for the controller 130 and the memory device 150 to perform operations such as read operations or program operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the present invention is not limited thereto. That is, the memory 144 may be located within or external to the controller 130. For instance, the memory 144 may be embodied by an external volatile memory having a memory interface transmitting data and/or signals between the memory 144 and the controller 130.

The memory 144 can store data for performing operations such as data writing and data reading requested by the host 102 and/or data transmitted between the memory device 150 and the controller 130 for background operations such as garbage collection and wear levelling as described above. According to an embodiment, for supporting operations in the memory system 110, the memory 144 may include a program memory, a data memory, a write buffer/cache, a read buffer/cache, a data buffer/cache, a map buffer/cache, and the like.

The memory 144 may store a map data and state information. The controller map data includes L2P map data comprising L2P segments including a logical address used in the host 102 and a physical address of the memory device 150 corresponding to the logical address. The controller map data may further include P2L map data comprised of P2L segments including the physical address used and the logical address corresponding to the physical address.

The processor 134 may be implemented with a microprocessor and/or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. According to an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and the like. Particularly, the FTL may load, generate, update, or store map data. Therefore, the controller 130 may map a logical address, which is entered from the host 102, with a physical address of the memory device 150 through the map data. The memory device 150 may function like a general storage device to perform a read or program operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the newly programmed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 can handle instructions or commands corresponding to an inputted command from the host 102. The controller 130 can perform a foreground operation as a command operation, corresponding to a command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation of copying data stored in a memory block among the memory blocks 152, 154, 156 in the memory device 150 and storing such data in another memory block, e.g., a garbage collection (GC) operation. The background operation can include an operation of moving or swapping data between memory blocks of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) among a plurality of channels(or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe relevant information about the memory device 150, which is data with a specific format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the program operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 2:
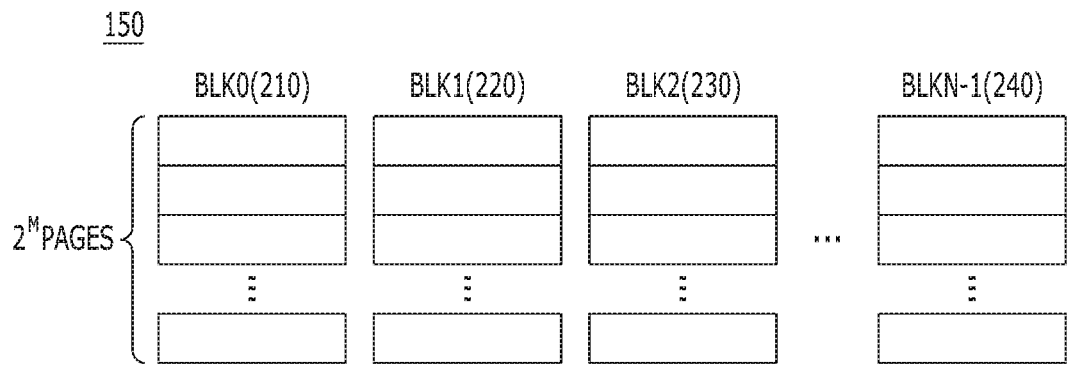
FIG. 2 is a schematic diagram illustrating an exemplary configuration of a memory device of the memory system.

FIG. 2 is a schematic diagram illustrating a configuration of a memory device, e.g., memory device 150, employed in the memory system of FIG. 1.

Referring to FIG. 2, the memory device 150 may include a plurality of memory blocks BLOCK0 to BLOCKN−1, e.g., BLOCK0 (210), BLOCK1 (220), BLOCK2 (230), and to BLOCKN−1 (240). Each of the memory blocks 210, 220, 230 and 240 may include a plurality of pages, for example 2M pages, the number of which may vary according to circuit design. For example, in some applications, each of the memory blocks may include M pages. Each of the pages may include a plurality of memory cells that are coupled to a word line WL.

Furthermore, each of a plurality of memory blocks included in the memory device 150 may be implemented with a single level cell (SLC) memory block or a multi-level cell (MLC) memory block capable of storing two or more bits in one memory cell of that memory block. Some examples of MLC memory blocks are a double level cell memory block (to which the designation MLC memory block is sometimes applied in a more specific sense), a triple level cell (TLC) memory block, and a quadruple level cell (QLC) memory block.

According to an embodiment of the present invention, the memory device 150 may be a non-volatile memory, such as a flash memory, e.g., a NAND flash memory. However, the memory device 150 may be realized as any of a Phase Change Random-access Memory (PCRAM), a Resistive Random-access Memory (RRAM or ReRAM), a Ferroelectric Random-access Memory (FRAM), a Spin Transmit Torque Magnetic Random-access Memory (STT-RAM or STT-MRAM) and the like.

The memory blocks 210, 220, 230, . . . 240 may store the data transmitted from a host through a program operation, and transmit data stored therein to the host through a read operation.

Figure 3:
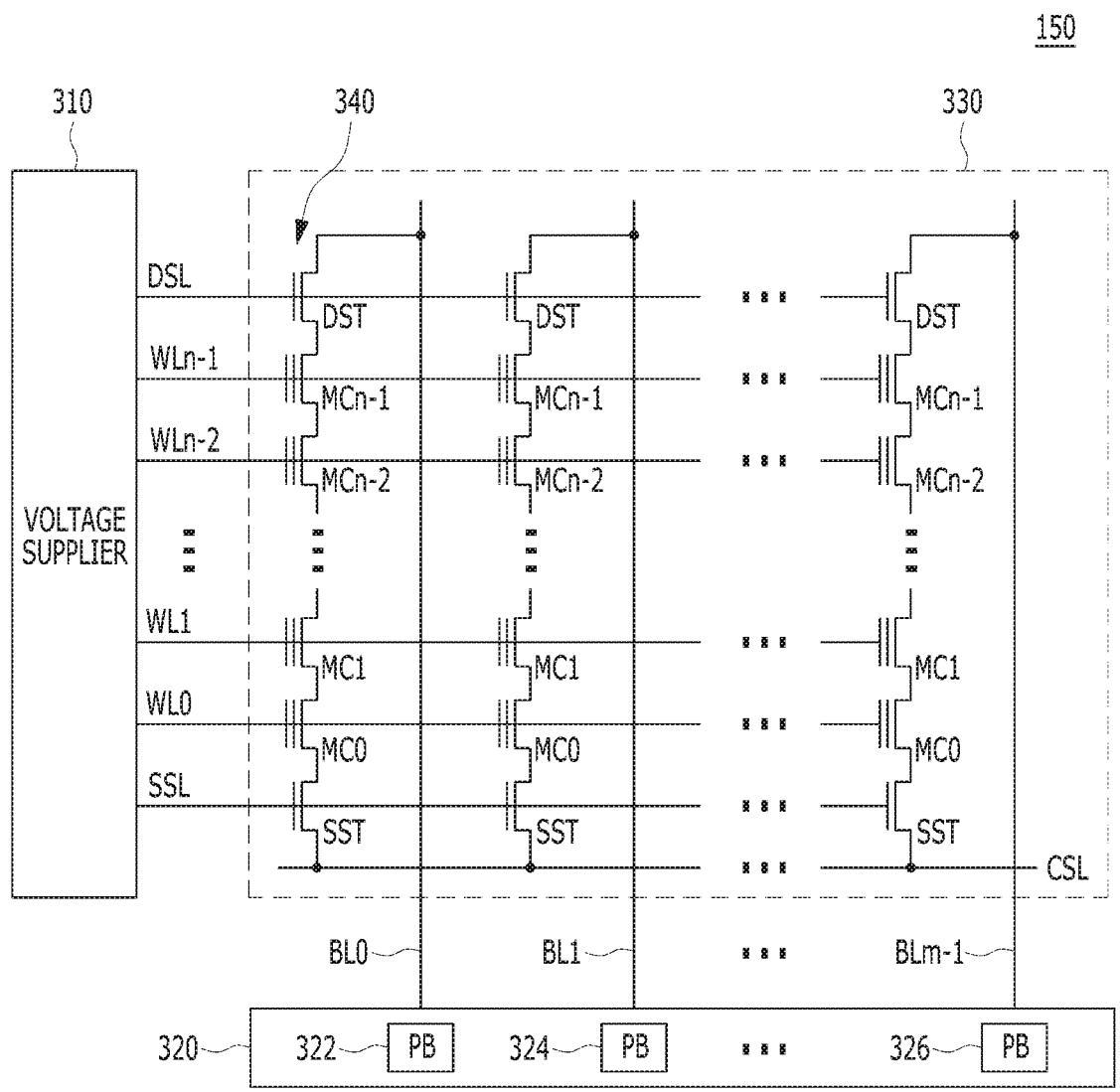
FIG. 3 is a circuit diagram illustrating an exemplary configuration of a memory cell array of a memory block in the memory device shown in FIG. 2.

FIG. 3 is a circuit diagram illustrating a memory block 330 in the memory device 150.

Referring to FIG. 3, the memory block 330 may correspond to any of the plurality of memory blocks 152 to 156.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC) each of which may store 1 bit of information, or by multi-level cells (MLC) each of which may store data information of a plurality of bits. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 shows, as an example, that the memory block 330 is constituted with NAND flash memory cells, it is to be noted that the memory block 330 of the memory device 150 is not so limited. The memory block 330 may be realized by a NOR flash memory, a hybrid flash memory in which at least two types of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supplier 310 of the memory device 150 may provide word line voltages, for example, a program voltage, a read voltage and a pass voltage, to be supplied to respective word lines according to an operation mode and voltages to be supplied to bulks, for example, well regions in which the memory cells are formed. The voltage supplier 310 voltage supplier 310 may perform a voltage generating operation under the control of a control circuit (not shown). The voltage supplier 310 voltage supplier 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification operation or a normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
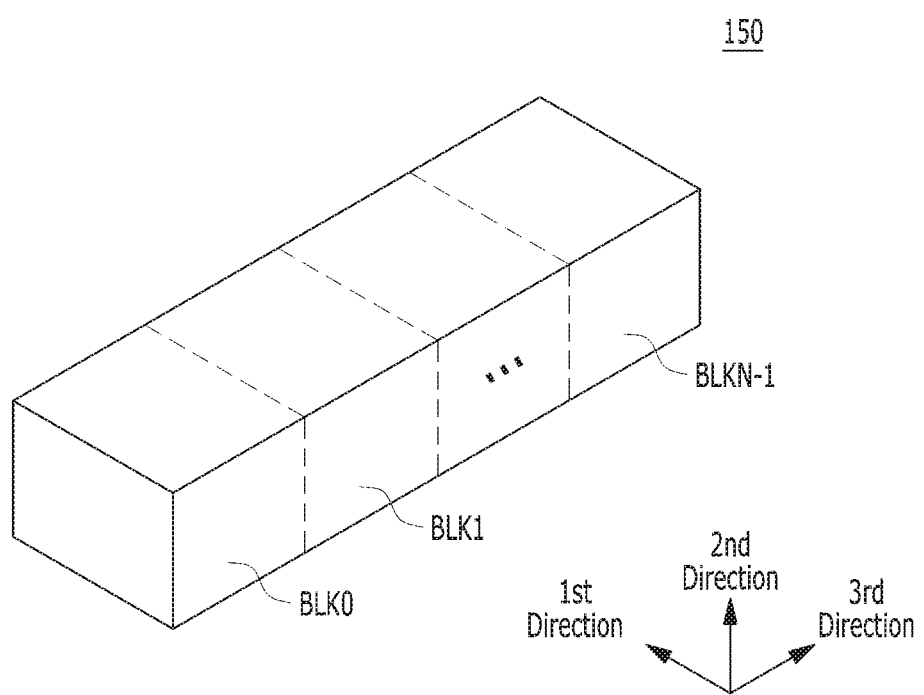
FIG. 4 is a schematic diagram illustrating an exemplary three-dimensional structure of the memory device shown in FIG. 2.

FIG. 4 is a schematic diagram illustrating a 3D structure of the memory device 150.

Referring to FIG. 4, the memory device 150 may be embodied in a nonvolatile memory device having a 3D stack structure. The memory device 150 may include a plurality of memory blocks BLK0 to BLKN−1 each having a 3D structure (or a vertical structure).

A method for searching for a dummy page in an open block is described below with reference to FIGS. 5 and 6.

Figure 5:
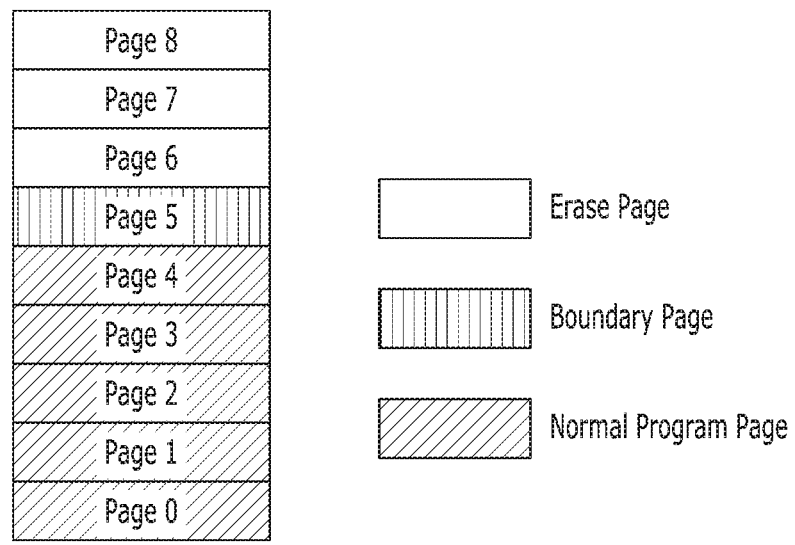
FIG. 5 illustrates an example of a memory block according to an embodiment of the present invention.

FIG. 5 is a block diagram illustrating a structure of a memory block according to an embodiment of the present invention. FIG. 6 is a diagram illustrating a method for searching for a boundary page according to an embodiment of the present invention.

According to an embodiment of the present invention, a plurality of memory blocks included in a memory device may include open blocks and closed blocks that are distinguished by types of pages included therein. A closed block may include only program pages where data is stored. An open block may include erase pages having a free area where data can be programmed. For example, an open block may include both program pages and erase pages. The open block may include an erase page, a program page, and a boundary page positioned at the boundary between the erase page and the program page.

In particular, when a sudden power-off (SPO) occurs during a program operation in an open block, the controller 130 may determine that data stored in the open block is deteriorated and hence such data is less reliable. Accordingly, the controller 130 may designate the open block in which the SPO occurs during the program operation as a partially closed block.

In an embodiment of the present invention, a program operation may include a normal program operation and a dummy program operation. The normal program operation of normal data may include a user data program operation from a host, a metadata program operation of metadata, a data flushing operation of data stored in a write buffer/cache and a copy operation of valid data stored in a victim block that is a target of a background operation. The dummy program operation of dummy data may be performed on dummy pages including a boundary page and erase pages by applying a dummy program voltage, i.e., a one-shot pulse, to word-lines coupled to the boundary page and the erase pages. Thus, threshold voltages of the memory cells in the dummy pages may be shifted.

The open block shown in FIG. 5 may include a boundary page PAGE 5. The boundary page PAGE 5 in FIG. 5 may be generated due to the sudden power-off SPO. Below the boundary page PAGE 5 are normal program pages PAGE 0 to PAGE 4, having a smaller page offset than the boundary page PAGE 5, on which the normal program operations of normal data are performed. Above the boundary page PAGE 5 are erase pages PAGE 6 to PAGE 8 that are not programmed with data (which means that the program operation is not performed). The boundary page PAGE 5 may be a page positioned at a physical boundary between the erase pages PAGE 6 to PAGE 8 and the normal program pages PAGE 0 to PAGE 4. In an embodiment of the present invention, the normal data includes user data received from the host or metadata generated by the controller 130, not the dummy data.

A phenomenon such as charge loss and charge acquisition may occur in the memory cells, which widens a threshold voltage distribution, thereby reducing reliability of the stored data. According to an embodiment of the present invention, the controller 130 may designate an open block, including program pages in which normal data with decreased reliability and erase pages are stored, as a partially closed block based on state information of the memory device 150. Accordingly, the controller 130 may determine to no longer perform a program operation and a read operation on the partially closed block.

Before performing a program operation of new normal data on the program pages in the partially closed block, an erase operation may have to be performed. The partially closed block may be a target block for the erase operation. However, since the erase operation is not performed only on the program pages but is performed on a whole memory block basis, the erase operation may be performed on the erase pages in the partially closed block too, thereby causing a deep-erase.

According to an embodiment of the present invention, a threshold voltage of the memory cells in the dummy pages may be shifted to between an erase page threshold voltage and a program page threshold voltage by performing the dummy program operation on the dummy pages. An erase operation is performed on the partially closed block after the dummy program operation is performed on the partially closed block. Accordingly, a deep-erase in the erase pages of the partially closed block may be prevented. The time taken for the dummy program operation performed on the boundary page and the erase pages may be shorter than the time taken for the normal program operation of the normal data.

Figure 6:
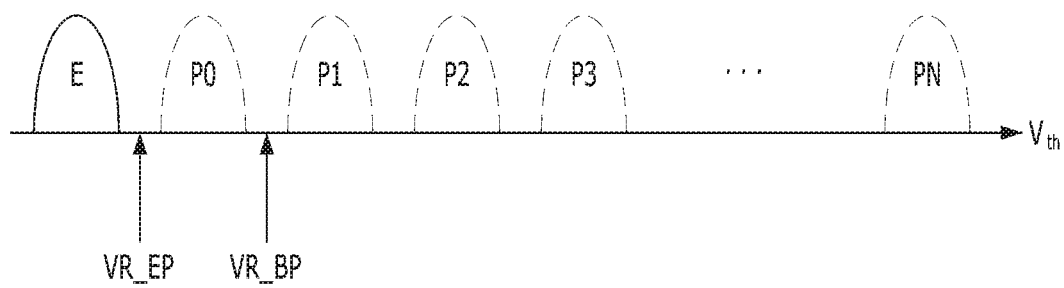
FIG. 6 is a diagram for describing a method for detecting a boundary page according to an embodiment of the present invention.

FIG. 6 is a diagram for describing a method for searching for a dummy page in the partially closed block shown in FIG. 5. In particular, the dummy page searching method may be performed by a dummy page searching circuit 133, which is described below with reference to FIG. 8.

In this example, 3-bit data may be programmed in each of the memory cells. As illustrated in FIG. 6, by the normal program operation, a threshold voltage of a memory cell may be shifted to one among an erase state E and program states P0 to PN.

A boundary page read voltage VR_BP may be used to search for the boundary page in the partially closed block. The boundary page may be searched for by sequentially performing read operations by applying the boundary page read voltage VR_BP to word-lines of the partially closed block. For example, a page corresponding to a word line in which the number of memory cells whose threshold voltage is higher than the boundary page read voltage VR_BP and is greater than a reference value may be determined as the boundary page.

An erase page read voltage VR_EP may be used to search for the erase page in the partially closed block. The erase page may be searched for by sequentially performing read operations by applying the erase page read voltage VR_EP to some of the word-lines of the partially closed block. For example, a page corresponding to a word line in which the number of memory cells whose threshold voltage is higher than the erase page read voltage VR_EP and is less than a reference value, may be determined as the erase page.

According to an embodiment of the present invention, the boundary page read voltage VR_BP may vary depending on the number of bits of a data stored in the memory cells. That is, although the example in FIG. 6 shows that 3-bit data may be stored in each memory cell, the boundary page read voltage VR_BP may be different when a 2-bit data is stored in each memory cell and when single-bit data is stored in each memory cell.

Figure 7A:
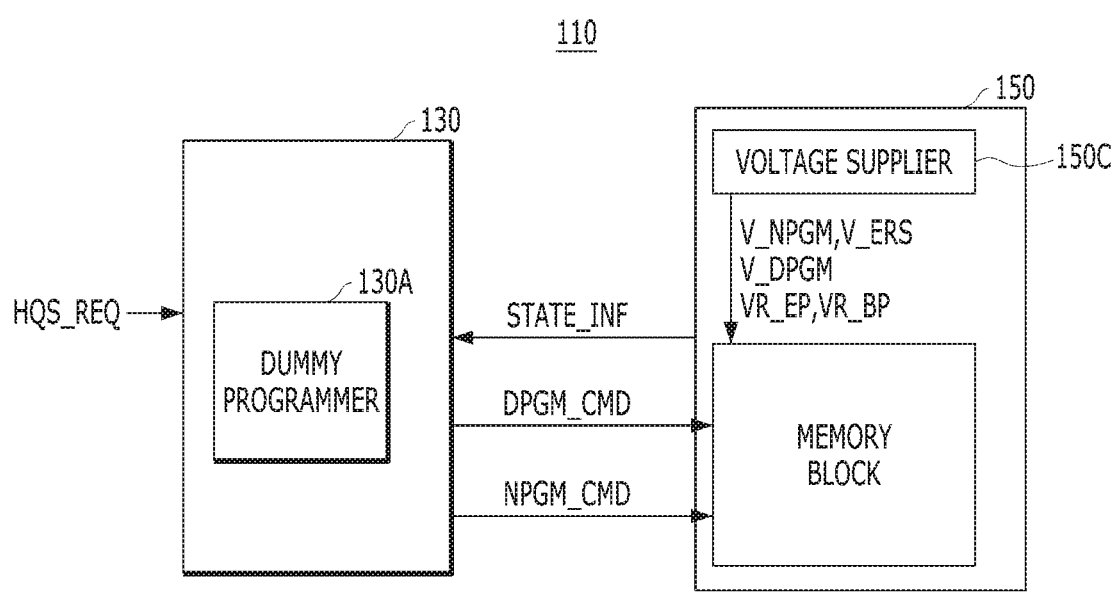
FIGS. 7A and 7B illustrate an example of a memory system for generating a dummy page group according to an embodiment of the present invention.
Figure 7B:
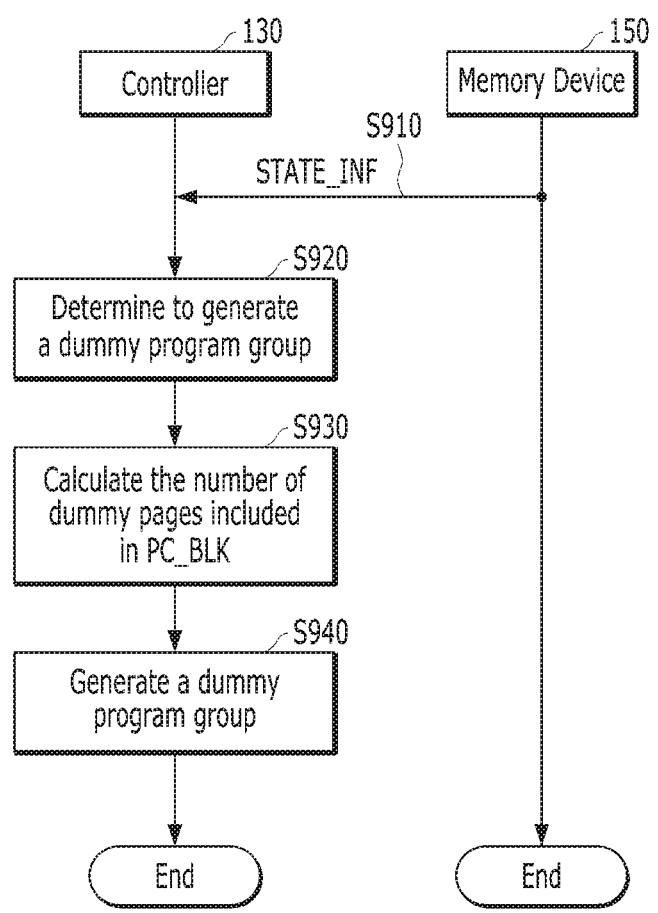

FIG. 7A is a block diagram illustrating a memory system 110 according to an embodiment of the present invention. FIG. 7B is a flowchart illustrating a method for generating a dummy page group according to an embodiment of the present invention, which method is described below with additional reference to FIG. 7A.

Referring to FIG. 7A, the memory system 110 may include a controller 130 and a memory device 150. The controller 130 may include a dummy programmer 130A suitable for performing a dummy program operation.

In response to a dummy program command DPGM_CMD received from the controller 130, the memory device 150 may perform the dummy program operation on the partially closed block included in a memory element in an idle state in which a read operation or a program operation is not being performed. In response to a normal program command NPGM_CMD received from the controller 130, the memory device 150 may perform a normal program operation on an open block included in a memory element. The memory element may include at least one among a plurality of planes each of which includes a plurality of memory blocks and a plurality of memory dies each of which include the plurality of planes. The user area and the meta area may include the partially closed block and the open block described above with reference to FIG. 5.

The memory device 150 may store user data that is requested to be stored by the controller 130. To this end, the memory device 150 may include a user area for storing user data, and a meta area for storing metadata for managing the stored user data. Each of the user area and the meta area may include a plurality of memory blocks including a memory cell array.

The meta area may be formed of at least one memory block having the same structure as that of each of the memory blocks in the user area. The meta area may store state information STATE_INF representing states of the partially closed block or the open block that are included in the user area and the meta area. To be specific, in an embodiment of the present invention, the state information STATE_INF may represent a bad state in which data stored in the pages in the open block is not deemed to be reliable. Reliability of the stored data in the pages may decrease when the number of times that the read operation is performed on the page is more than a certain number of times. For example, the state information STATE_INF may represent a bad state in which a read operation is performed while performing a program operation on an open block. Also, the state information STATE_INF may represent a bad state in which a read operation has been performed a certain number of times or more. Also, the state information STATE_INF may represent a bad state in which a sudden power-off (SPO) occurs while performing a program operation on an open block. Also, the state information STATE_INF may represent a bad state in which data was not properly programmed in an open block, i.e., the programming operation failed. Also, the state information STATE_INF may represent a bad state in which a program failure occurs on the open block. Also, the state information STATE_INF may represent a bad state in which power is not supplied for a time that exceeds a set time after the power was properly turned off. The controller 130 determines an open block for which the state information STATE_INF indicates the bad state as the partially closed block.

The memory device 150 may generate a plurality of internal voltages for performing a normal program operation, a dummy program operation, an erase operation, and a read operation. To this end, the memory device 150 may include a voltage supplier 150C. The voltage supplier 150C may provide a plurality of memory blocks with a normal program voltage V_NPGM for performing the normal program operation, an erase voltage V_ERS for performing the erase operation, and a dummy program voltage V_DPGM for performing the dummy program operation on a boundary page and an erase page, an erase page read voltage VR_EP for searching for an erase page, and a boundary page read voltage VR_BP for searching for a boundary page.

Shown in FIG. 7B, the memory device 150 may transmit state information STATE_INF to the controller 130 according to a request from the controller 130 in step S910. The controller 130 may receive the state information STATE_INF of the memory device 150 to determine states of the open blocks in the memory device 150. For example, when the state information STATE_INF represents that an open block is in a bad state, the controller 130 may designate that open block as a partially closed block in which a program operation and a read operation are not performed any more.

The dummy programmer 130A may determine to generate a dummy page group by grouping the dummy pages in the partially closed block in step S920, under a control of the controller 130. The dummy programmer 130A may generate the dummy page group in an idle state of the memory device 150.

Also, the dummy programmer 130A may generate the dummy page group when a write request with user data is received from a host 102, to perform a dummy program operation while a normal program operation of the user data is being performed. That is described below with reference to FIG. 10.

The dummy programmer 130A may calculate the number of dummy pages including the boundary page and the erase pages in each of the partially closed blocks in step S930.

The dummy programmer 130A may generate at least one dummy page group based on a set dummy page count in step S940. The dummy page count means the number of pages included in one dummy page group and is a unit of execution of a dummy page group generation.

The dummy page count may be determined based on the number of dummy pages calculated in step S930, a reduction rate of valid pages in the memory device 150, the number of free blocks in the memory device 150 or a time taken for the normal program operation requested by the controller 130 or a host request HOST_REQ received from a host (see FIG. 1).

The host request HOST_REQ may include a write request of user data and a cache flushing request of user data. A normal program operation in response to the write request may include a program operation of programming user data received with the write request to the open block in the memory device 150. The normal program operation in response to the cache flushing request may include a program operation of programming temporarily stored user data from the memory 144 of the controller 130 to the open block in the memory device 150 (see FIG. 1).

The normal program operation by the controller 130 may include a program operation for updating metadata or a copy operation of valid data stored in a victim block of a background operation.

The dummy page group may include dummy pages having the same page offset (pages with the same location) and included in different partially closed blocks. In this case, the different partially closed blocks may be included in different memory dies. Also, the different memory dies may transmit and receive data to and from the controller 130 through different channels based on an interleaving scheme.

Also, the dummy page group may include dummy pages having different page offsets (pages with different locations) and included in the same partially closed block.

Also, the dummy page group may include dummy pages included in different partially closed blocks having the same page offset and dummy pages included in the same partially closed block having different page offsets.

The dummy programmer 130A may perform the dummy program operation on at least one dummy page group included in a memory element in the idle state. The idle state may include a state that a normal program operation or a read operation is not being performed. The dummy programmer 130A may perform the dummy program operation on at least one dummy page group included in a memory element coupled to the channel and in an idle state in which no data transmitting/receiving operation is performed. The memory element may include a plane or memory die.

Herein, the controller 130 may flexibly adjust a dummy page count and the number of dummy programs to be executed based on the calculated number of dummy pages. Also, while a normal program operation is being performed on a memory element, the controller 130 may perform the dummy program operation on another memory element in which the normal program operation is not being performed.

The dummy programmer 130A selects at least one partially closed block on which the dummy program operation is to be performed based on the state information STATE_INF. The dummy programmer 130A generates at least one dummy page group by grouping a plurality of dummy pages included in the partially closed blocks. The controller 130 may generate a dummy page group information based on the generated dummy page group.

Accordingly, the controller 130 may transmit the dummy program command DPGM_CMD in order to perform the dummy program operation on the at least one dummy page group in the memory element in the idle state. The dummy program command DPGM_CMD may include physical addresses of the dummy pages in a dummy page group in which the dummy program operation is to be performed and a command for supplying the dummy program voltage V_DPGM to the word lines coupled to the dummy pages. The controller 130 may transmit the normal program command NPGM_CMD in order to perform the normal program operation on the open block. The normal program command NPGM_CMD may include physical addresses of the erase pages in which a normal program operation is to be performed.

Herein, a first memory die including a memory element in which the dummy program operation DPGM_CMD is performed is different from a second memory die including a memory element in which the normal program operation NPGM_CMD is being performed. The first and second memory dies are coupled to the controller 130 through different channels. The dummy program operation and the normal program operation may be performed in an interleaving scheme through the different channels.

The memory system 110 performs an erase operation on the partially closed block after the dummy program operation is performed on the partially closed block. Accordingly, the memory system 110 according to an embodiment of the present disclosure may prevent the erase pages and the boundary page in a partially closed block from being deep-erased by performing an erase operation after performing a dummy program operation based on the state of the memory device 110, thus improving the lifespan and reliability of the partially closed block.

Also, the memory system 110 may generate a dummy page group to adjust the dummy page count which is an execution unit basis of a dummy program operation and the number of times that a dummy program operation is performed.

Also, the memory system 110 may independently perform a dummy program operation on a dummy page group included in a memory element in the idle state while the normal program operation is performed. In this manner, overhead applied to the memory system 100 may be reduced.

Figure 8:
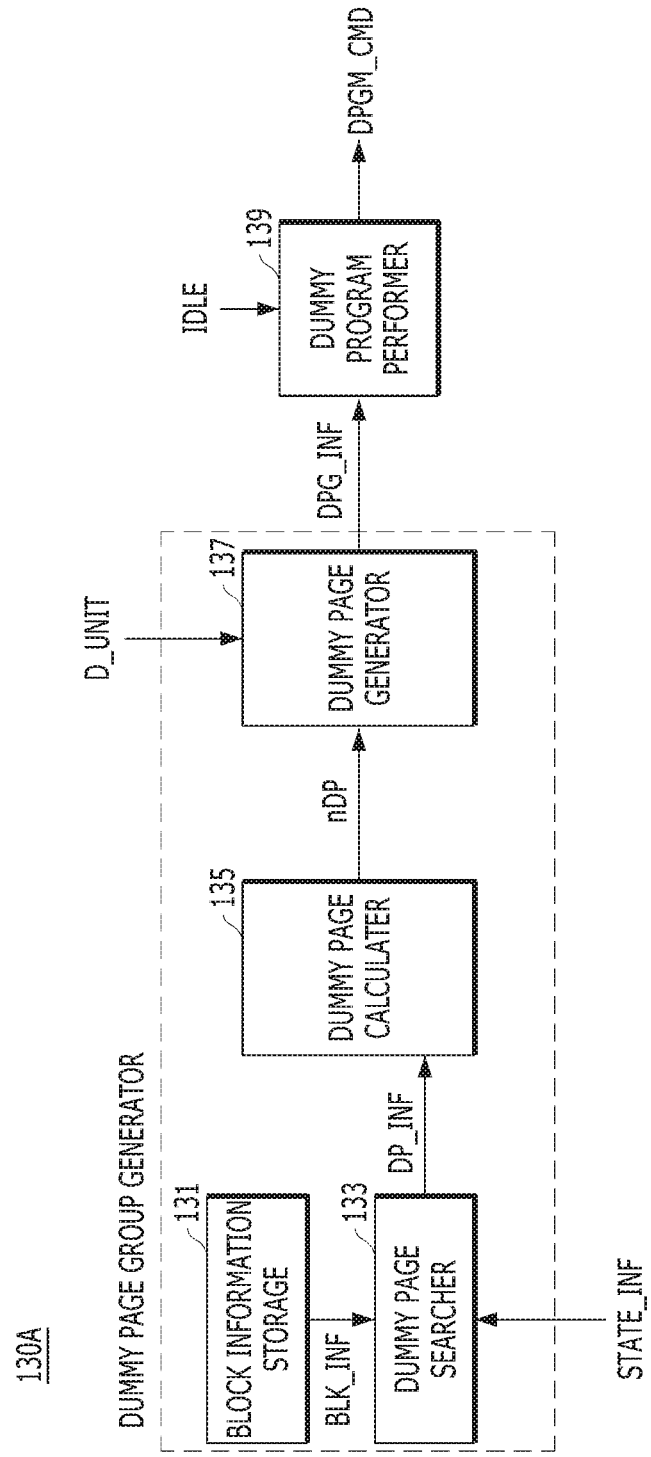
FIG. 8 is a block diagram illustrating an example of a dummy page count.

FIG. 8 is a block diagram illustrating an example of the dummy programmer 130A included in the controller shown in FIG. 7A. An example of a method for generating a dummy page group and performing a dummy program operation is described below with reference to FIGS. 7A and 8.

When the controller 130 determines that a dummy page group is to be generated in a partially closed block based on the state information STATE_INF received from the memory device 150, the controller 130 may generate a dummy page count D_UNIT. The dummy page count D_UNIT may be determined by the controller 130.

The dummy page count D_UNIT may be determined based on at least one of the calculated number of dummy pages, a reduction rate of valid pages in the memory device 150, the number of free blocks in the memory device 150 or a time taken for a normal program operation.

The dummy programmer 130A may include a dummy page group generator for calculating the number of dummy pages nDP included in a partially closed block and for generating at least one dummy page group by grouping a plurality of dummy pages based on the dummy page count D_UNIT under the control of the controller 130. The dummy page group generator 130A may also include a dummy program performer 139 for independently performing a dummy program operation on at least one dummy page group included in a memory element in the idle state. Herein, the controller 130 may flexibly adjust the dummy page count D_UNIT and the number of times that a dummy program is performed based on the calculated number of dummy pages nDP.

The dummy page group generator may include a block information storage 131, a dummy page searcher 133, a dummy page calculator 135, and a dummy page group generator 137.

The block information storage 131 may store block information BLK_INF of a state of a plurality of memory blocks. The block information BLK_INF may be stored in one form among the forms of a list, a bitmap, and a data bit array.

In this example, among the five memory blocks, for example, BLK1 to BLK5, only the BLK2 and the BLK4 are partially closed blocks and the 1234th page of the BLK2 and the 2000th page of the BLK4 are boundary pages.

When the block information BLK_INF is represented in the form of a list, the block information BLK_INF may include information of "2→4" or information of "2/1234 and 4/2000". The information of "2→4" may represent that BLK2 and BLK4 are partially closed blocks. According to an embodiment of the present invention, the block information BLK_INF in the form of a list may include only partially closed block information. Also, the information of "2/1234 and 4/2000" may represent that BLK2 and BLK4 are partially closed blocks, and the $1234^{th}$ page of BLK2 and the $2000^{th}$ page of BLK2 are boundary pages. According to an embodiment of the present invention, the block information BLK_INF, which may be in the form of a list, may include both partially closed block information and dummy page information DP_INF.

When the block information BLK_INF is represented in a bitmap form, the block information BLK_INF may include five-digit binary number information, e.g., "01010". The bits of "01010" may correspond one-to-one to the five memory blocks. BLK2 and BLK4 corresponding to the value of '1' may be partially closed blocks, and BLK1, BLK3, and BLK5 corresponding to the value of '0' may be open blocks or closed blocks that are not partially closed blocks. According to an embodiment of the present invention, the block information BLK_INF in a bitmap form may include only partially closed block information.

When the block information BLK_INF is represented in a form of a data bit array, the block information BLK_INF may include hexadecimal number information of a form of "0xffff/0x1234/0xffff/0x2000/0xffff". Each hexadecimal number information "0xffff", "0x1234", "0xffff", "0x2000", and "0xffff" may correspond one-to-one to each of the five memory blocks, and may represent partially closed block information and the dummy page information DP_INF. For example, the memory block corresponding to the block information BLK_INF of 0xffff may represent that the memory block is a free block or a closed block that is not a partially closed block. In other words, BLK1, BLK3, and BLK5 represented by the block information BLK_INF of 0xffff, may not be partially closed blocks. BLK2 corresponding to the block information BLK_INF of 0x1234 and BLK4 having the block information BLK_INF of 0x2000 are partially closed blocks, and 1234 and 2000 may represent boundary pages of BLK2 and BLK4. According to an embodiment of the present invention, the block information BLK_INF in the form of a data bit array may include partially closed block information and dummy page information DP_INF.

The dummy page searcher 133 may search for a boundary page and an erase page through the boundary page searching method illustrated in FIG. 6, generate dummy page information DP_INF, and transmit the generated dummy page information DP_INF to the dummy page calculator 135.

The dummy page calculator 135 may calculate the number of dummy pages nDP1 in each partially closed block based on the dummy page information DP_INF that is transmitted from the dummy page searcher 133.

The dummy page calculator 135 may calculate the number of dummy pages nDP3 in a super block including a plurality of partially closed blocks BLK0 and BLK1 to BLKN−1.

To this end, the dummy page calculator 135 may receive the number N of partially closed blocks BLK0 and BLK1 to BLKN−1 from the controller 130, and page offsets of the pages included in the partially closed blocks BLK0 and BLK1 to BLKN−1.

The dummy page searcher 133 may search at least one dummy page line including dummy pages having the same page offset as one dummy page group.

The dummy page searcher 133 may search an initial dummy page line. The initial dummy page has the lowest page offset among the page lines consisting of dummy pages. The dummy page searcher 133 may determine page lines whose page offset is equal to or greater than the initial dummy page line as a dummy page line, and calculate the number of dummy pages nDP3 included in the dummy page lines.

The dummy page searcher 133 may search the initial dummy page line by sequentially performing an operation of comparing the number of the dummy pages nDP2 included in the corresponding page line with the number N of the partially closed blocks from a first page line that is formed of pages whose initial value is 1 (P=1).

The dummy page searcher 133 may calculate the largest page offset among the page offsets of the boundary pages included in the N partially closed blocks, and determine a page line having the largest page offset as the initial dummy page line. Detailed description thereof is given below with reference to FIGS. 13A and 13B.

The dummy page group generator 137 may be able to generate a dummy page group by grouping the dummy pages that are included in a partially closed block based on the number of dummy pages nDP received from the dummy page calculator 135 and a dummy page count D_UNIT received from the controller 130.

The dummy program performer 139 may perform a dummy program operation on at least one dummy page group included in a memory element in the idle state based on the idle information IDLE received from the controller 130 and the dummy page grouping information D_PG_INF received from the dummy program performer 139. To this end, the dummy program performer 139 may transmit the dummy program command DPGM_CMD and the dummy data D_DAT to the memory device 150.

The dummy program performer 139 may perform a dummy program operation on at least one dummy page group included in each of the partially closed blocks. Also, the dummy program performer 139 may perform a dummy program operation on at least one dummy page group included in a super block formed of a plurality of partially closed blocks BLK0 and BLK1 to BLKN−1. Detailed description thereof is provided below with reference to FIGS. 13A to 13C.

Figure 9:
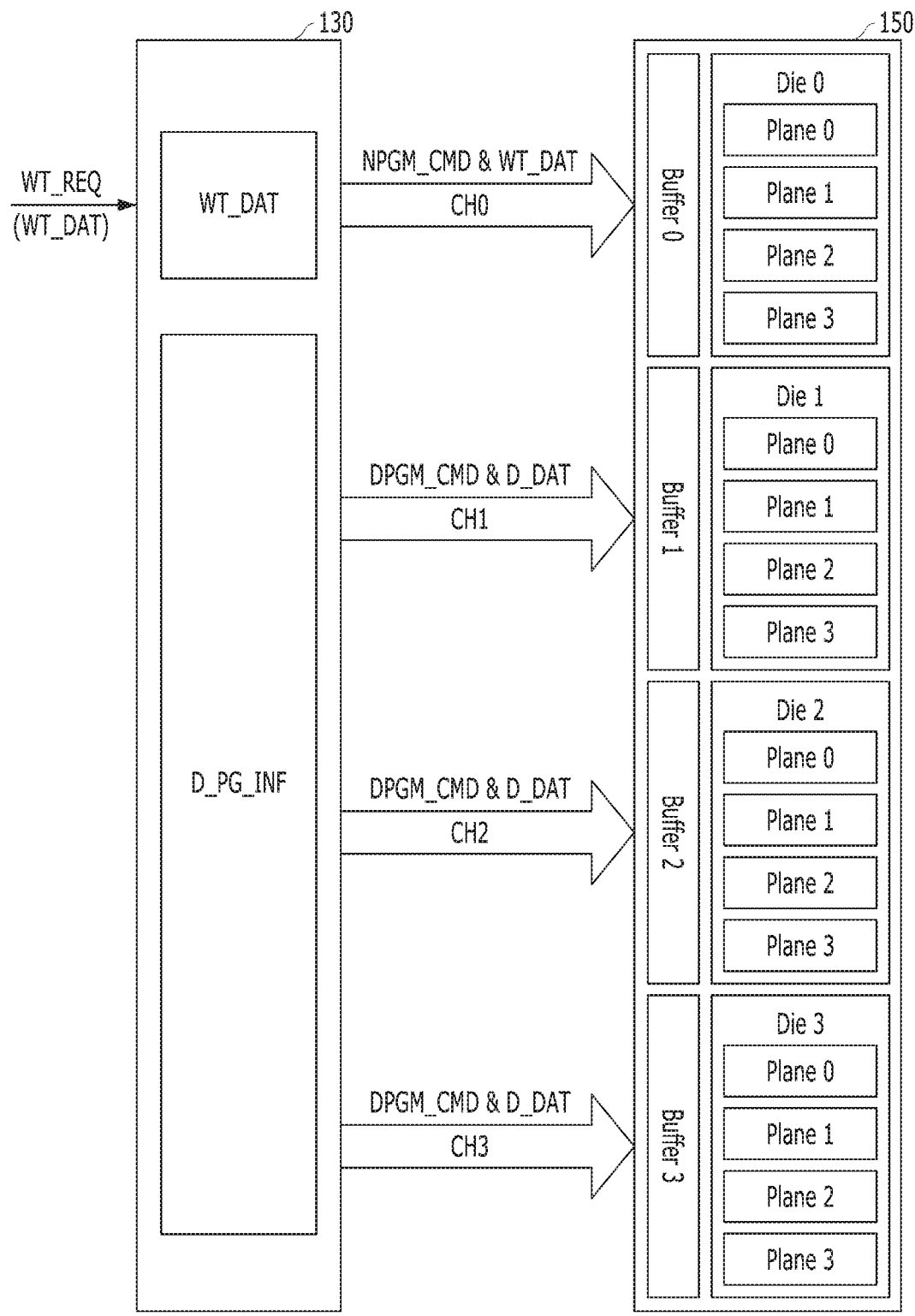
FIG. 9 is a block diagram illustrating an example of a memory system that performs a dummy program operation.

FIG. 9 is a block diagram illustrating a memory system 110 that includes a memory device 150 including a plurality of memory elements (planes or memory dies) and a controller 130 for performing a normal program operation and a dummy program operation on the memory device 150.

The memory device 150 illustrated in FIG. 9 may include first to fourth memory dies DIE0 to DIE3, each of which may include first to fourth planes PLANE) to PLANE 3. The first to fourth memory dies DIE0 to DIE3 may be coupled to the controller 130 through different channels CH0 to CH3, respectively, in order to transmitted data with each other.

Figure 10:
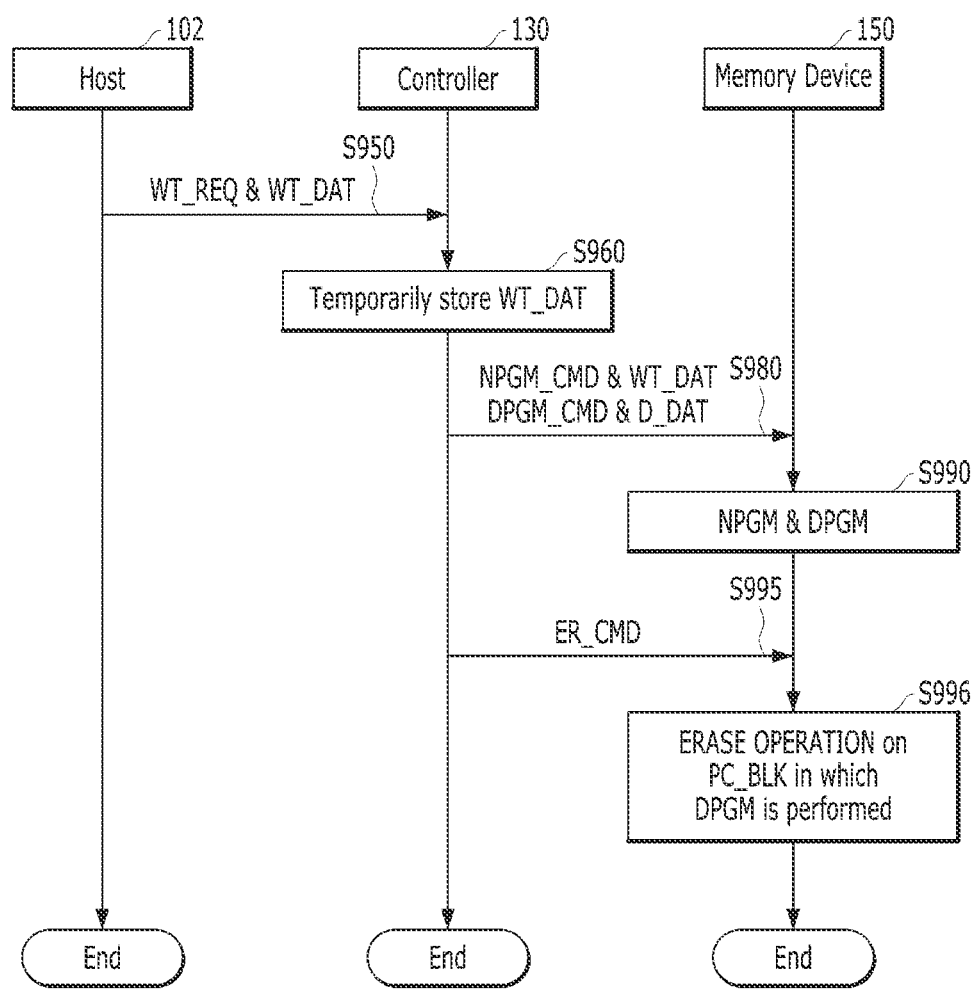
FIG. 10 illustrates an example of a method for performing a dummy program operation.

FIG. 10 is a flowchart describing a method for performing a normal program operation and a dummy program operation of the memory system 110 according to an embodiment of the present invention. Such method is described below with additional reference to FIG. 9.

In particular, FIGS. 9 and 10 describe an example of performing a dummy program operation on a dummy page group included in the second to fourth memory dies DIE1 to DIE3 which are in the idle state, while a normal program operation is performed in an open block in the first memory die DIE0. However, the dummy program operation of the present invention is not limited to being performed simultaneously with the normal program operation.

Referring to FIGS. 9 and 10, when the controller 130 receives a write request WT_REQ together with the user data WT_DAT from the host 102 in step S950, the controller 130 may temporarily store the received user data WT_DAT in the memory 144 of the controller 130 in step S960.

Subsequently, when the user data WT_DAT temporarily stored in the memory 144 is requested to be flushed, the controller 130 may perform a normal program operation for flushing the user data WT_DAT stored in the memory 144 to the memory device 150. The flushing operation of the user data WT_DAT stored in the memory 144 may be requested by the host 102 or may be requested by the controller 130 itself. The controller 130 may select an open block in which the normal program operation of the user data WT_DAT is to be performed.

Steps S980 to S996 are described in the context that a plurality of dummy page groups are generated in steps S920 to S940.

The controller 130 may select at least one dummy page group of a partially closed block in which a dummy program operation is to be performed. A first memory element including the selected dummy page group is coupled to a different channel from a second memory element including the open block in which the normal program operation is to be performed. The first memory element including the selected dummy page group is in an idle state in which a read operation or a program operation is not being performed. The channel between the first memory element and the controller 130 is in an idle state in which data transmitting is not being performed. The first and second memory elements may be a plane or a memory die.

If it is determined that the normal program operation of the user data WT_DAT is performed on the first memory die DIE0 and all of the second to fourth memory dies DIE1 to DIE3 are in the idle state, the controller 130 performs the normal program operation on the first memory die DIE0 and performs the dummy program operation on at least one of the second to the fourth memory dies DIE1 to DIE3.

To this end, the controller 130 may transmit a normal program command NPGM_CMD for programming the flushed user data WT_DAT to the first memory die DIE0 through the first channel CH0 in step S980. Also, the controller 130 may transmit a dummy program command DPGM_CMD for programming the dummy data D_DAT into at least one of the second to fourth memory dies DIE1 to DIE3 through the second to fourth channels CH1 to CH3 in step S980.

The memory system 150 may perform the dummy program operation during performing of the normal program operation using an interleaving scheme, based on the normal program command NPGM_CMD and the dummy program command DPGM_CMD in step S990. Accordingly, an execution time of the normal program operation and an execution time of the dummy program operation may overlap with each other. The normal program operation and the dummy program operation may be performed in parallel, independently at the same time.

Since the dummy program operation is performed in the second to fourth memory dies DIE1 to DIE3 while the normal program operation is performed in the first memory die DIE0, the overhead applied to the memory system due to the dummy program operation may be reduced. Accordingly, an efficiency of the dummy program operation may be increased.

Furthermore, the dummy program operations performed on the different memory dies DIE1 to DIE3 may be performed using an interleaving scheme. Accordingly, the execution times of the normal program operations performed on the different memory dies DIE1 to DIE3 may overlap with each other. The dummy program operations performed on the different memory dies DIE1 to DIE3 may be performed through the different channels CH1 to CH3 in parallel, independently at the same time.

Also, the dummy program operation may be performed on a plane basis. For example, when the normal program operation is determined to be performed on first to fourth planes PLANE) to PLANE3 of the first memory die DIE0 and a first plane PLANE) of the second memory die DIE1, the controller 130 may determine to perform the dummy program operation on the second to fourth planes PLANE1 to PLANE3 of the second memory die DIE1 and the third and the fourth memory dies DIE2 and DIE3. Herein, the execution time of a normal program operation and the execution time of a dummy program operation may overlap with each other, and the normal program operation and the dummy program operation may be performed through different channels based on an interleaving scheme.

When the dummy program operation is completed in step S990, the controller 130 may transmit an erase command to the memory device 150 to perform an erase operation on the partially closed block including the dummy page group on which the dummy program operation is performed in step S995.

In step S996, the memory device 150 may perform an erase operation on the partially closed block based on the erase command received from the controller 130.

Hereinafter, a method for calculating the number of dummy pages of each of partially closed block and a method for generating a dummy page group of each of partially closed block is described with reference to FIGS. 11 and 12.

Figure 11:
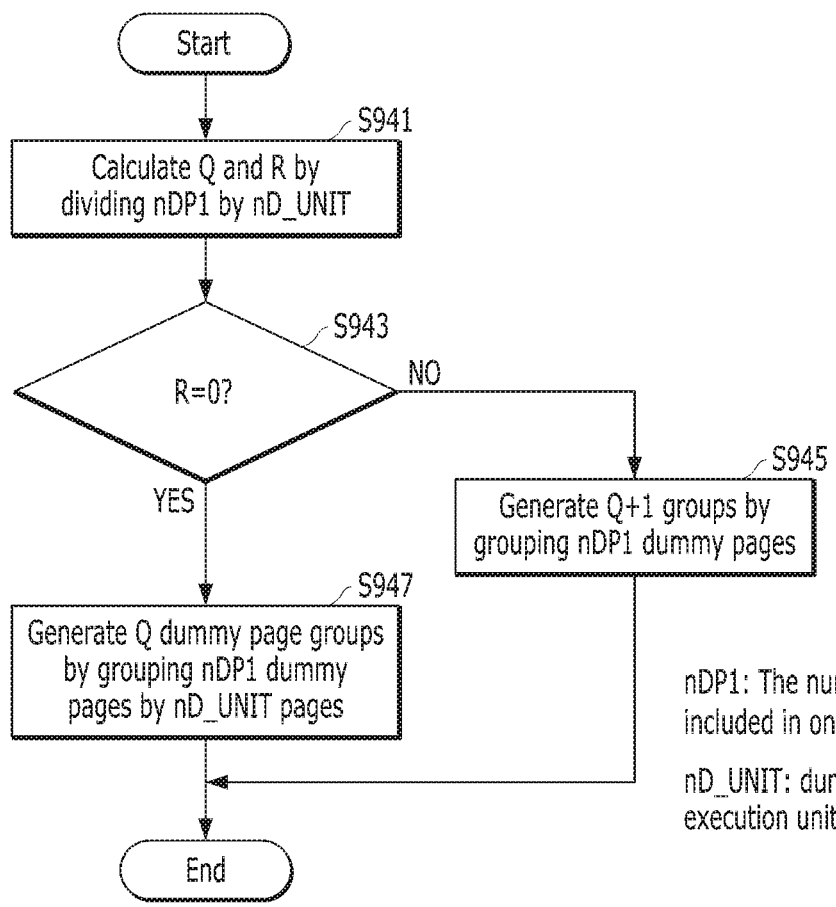
FIGS. 11 and 12 illustrate an example of a method for generating a dummy page group according to an embodiment of the present invention.
Figure 12:
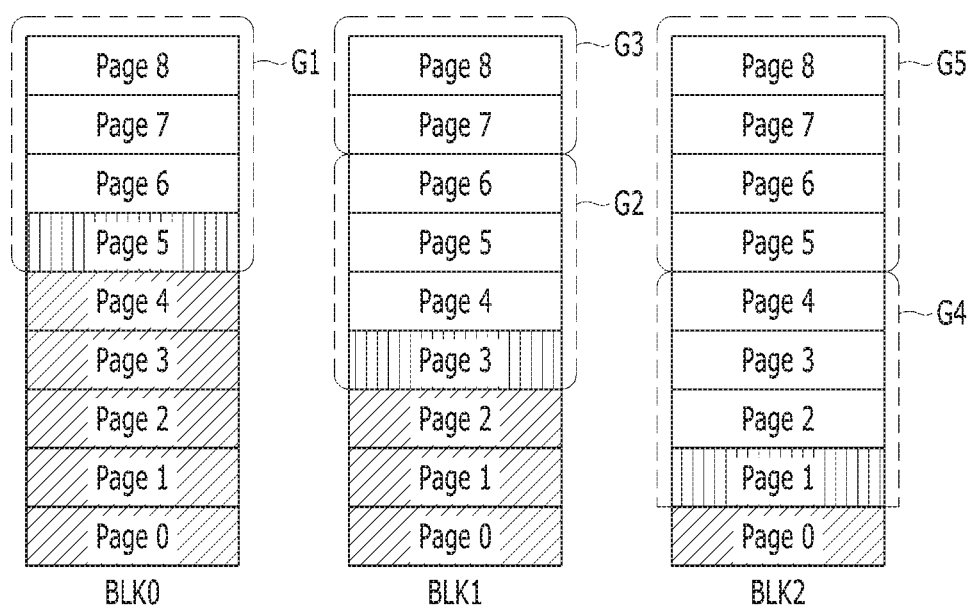

FIG. 11 is a flowchart describing the method for calculating the number of dummy pages and the method for generating a dummy page group according to an embodiment of the present invention, and FIG. 12 is a block diagram illustrating dummy page groups generated in connection with the method shown in FIG. 11.

In order to calculate the number of dummy pages nDP1, the dummy page calculator 135 may calculate nDP1 in each of the partially closed blocks based on the dummy page information DP_INF received from the dummy page searcher 133.

The dummy page group generator 137 may generate dummy page groups G1, G2, G3, G4, and G5 shown in FIG. 12 based on the number of dummy pages nDP1 included in each of the partially closed blocks BLK0, BLK1, and BLK2 that are received from the dummy page calculator 135 and the dummy page count D_UNIT received from the controller 130.

Referring to FIG. 11, the dummy page group generator 137 may calculate the quotient Q and the remainder R in step S941 by dividing nDP1 in one partially closed block by the dummy page count D_UNIT.

In step S943, it is determined whether or not the remainder R calculated through the operation of step S941 is 0.

As a result of the determination in the step S943, when the remainder R is '0' (YES in the step S943), nDP1 may be a multiple of the dummy page count D_UNIT. As a result, Q dummy page groups may be generated in step S947 by grouping the dummy pages by the dummy page count D_UNIT.

When the remainder R is not '0' (NO in the step S943), Q+1 dummy page groups may be generated in step S945. To be specific, Q dummy page groups may be generated by grouping the dummy pages by the dummy page count D_UNIT, and one dummy page group may be generated by grouping R dummy pages in step S945.

Hereinafter, a method for generating dummy page groups G1 to G5 that are included in each of the partially closed blocks BLK0, BLK1, and BLK2 of FIG. 12 is described through steps S941 to S947 shown in FIG. 11.

A first partially closed block BLK0 may include four dummy pages PAGE5 to PAGE8, and in this example herein the dummy page count D_UNIT is four. The quotient Q and the remainder R may be calculated by dividing the four dummy pages in the first partially closed block BLK0 by the dummy page count D_UNIT, which is four (S941 of FIG. 11). Herein, the quotient Q is 1 and the remainder R is 0 (YES in the step S943 of FIG. 11). Therefore, one dummy page group (Q=1) may be generated by grouping the four dummy pages (nDP1=4) by four (D_UNIT=4) in step S947. In other words, the first partially closed block BLK0 may include one dummy page group G1.

A second partially closed block BLK1 may include six dummy pages PAGE3 to PAGE8, and in this example herein the dummy page count D_UNIT is four. The quotient Q and the remainder R may be calculated by dividing the six dummy pages included in the second partially closed block BLK1 by the dummy page count D_UNIT, which is four (S941 of FIG. 11). Herein, the quotient Q is 1 and the remainder R is 2 (NO in the step S953). Therefore, one dummy page group (Q=1) may be generated by grouping the six dummy pages (nDP1=6) by four (D_UNIT=4) and additionally another dummy page group may be generated to include two dummy pages in step S947. In other words, the second partially closed block BLK1 may include two dummy page groups G2 and G3.

A third partially closed block BLK2 may include eight dummy pages PAGE1 to PAGE8, and in this example herein the dummy page count D_UNIT is four. The quotient Q and the remainder R may be calculated by dividing the eight dummy pages included in the third partially closed block BLK2 by the dummy page count D_UNIT, which is four (S941 of FIG. 11). Herein, the quotient Q is 2 and the remainder R is 0 (YES in the step S953). Therefore, two dummy page group (Q=2) may be generated by grouping the eight dummy pages (nDP1=8) by four (D_UNIT=4) in step S947. In other words, the third partially closed block BLK2 may include two dummy page groups G4 and G5.

Figure 13A:
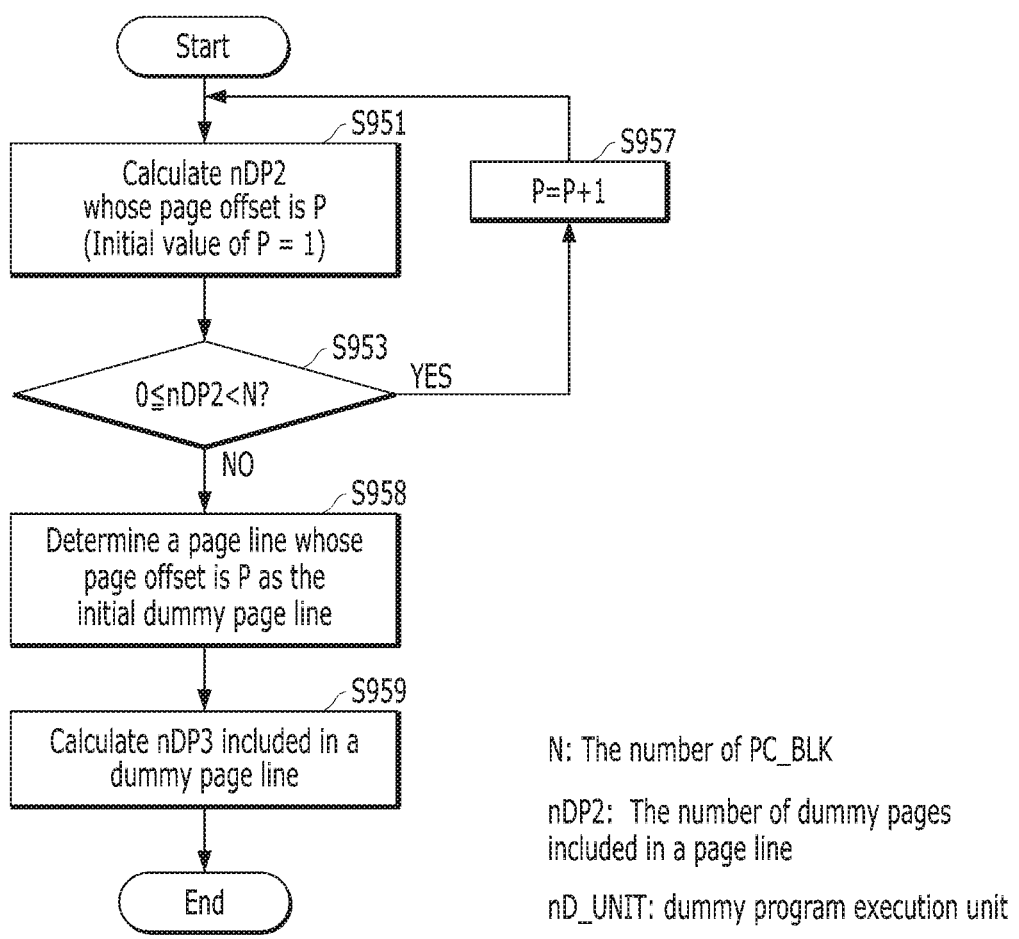
FIGS. 13A to 13C and FIG. 14 illustrate another example of a method for generating a dummy page group according to an embodiment of the present invention.

FIG. 13A illustrate an example of a method for calculating the number of dummy pages nDP3 included in a plurality of dummy page lines shared by a plurality of partially closed blocks based on the page offsets according to an embodiment of the present invention.

A page line may be formed of pages having the same page offset P. A dummy page line may include N dummy pages having the same page offset P and may be shared by N partially closed blocks BLK0 and BLK1 to BLKN−1. In other words, the dummy page line may be a page line formed of only dummy pages.

An initial dummy page line may be a dummy page line having the smallest page offset P among the dummy page lines. Also, the initial dummy page line may be a page line including a boundary page having the highest page offset P among the boundary pages included in the N partially closed blocks.

In order to calculate the number nDP3 of dummy pages nDP3 according to another embodiment of the present invention illustrated in FIG. 13A, the dummy page searcher (133 of FIG. 8) may receive the number N of the partially closed blocks BLK0 to BLKN−1 to be grouped and the page offsets P of the pages included therein from the controller 130.

Referring to FIG. 13A, the dummy page searcher 133 may calculate the number of dummy pages nDP2 that are included in a page line which is formed of pages whose page offsets (where P=+1 and the initial value=1) are sequentially increasing from 1 in step S951.

The dummy page searcher 133 may determine in step S953 whether nDP2 calculated in step S951 is equal to or greater than 0 and less than N.

As a result of the determination in step S953, when nDP2 is equal to or greater than 0 and less than N (YES in step S953), the dummy page searcher 133 determines that the page line having the page offset P is not a dummy page line. The page line having the page offset P is a normal page line including only N normal program pages or an open page line including a normal program page and a dummy page.

Accordingly, the dummy page searcher 133 may increase the value of the page offset P by '1' in step S957, and go back to the step S951 to perform the operations of steps S951 and S953 again. Herein, when the operation of step S951 is performed again, the number nDP2 of the dummy pages included in a page line having the page offsets of 'P=P+1' may be calculated.

As a result of the determination in step S953, when the number of dummy pages nDP2 in the page line having the page offsets of 'P=P+1' is equal to or greater than 0 and less than N (NO in step S953), nDP2 may be N. Therefore, the dummy page searcher 133 determines that the page line including the pages having the page offsets of 'P=P+1' as the initial dummy page line in step S958.

Since all the page lines whose page offsets are equal to or greater than 'P=P+1' are dummy page lines, the dummy page calculation unit 135 may calculate the number of dummy pages nDP3 of the dummy page lines shared by the N partially closed blocks in step S959 by summing the number of the dummy pages nDP2 included in the dummy page lines whose page offsets are equal to or greater than 'P=P+1'.

Figure 13B:
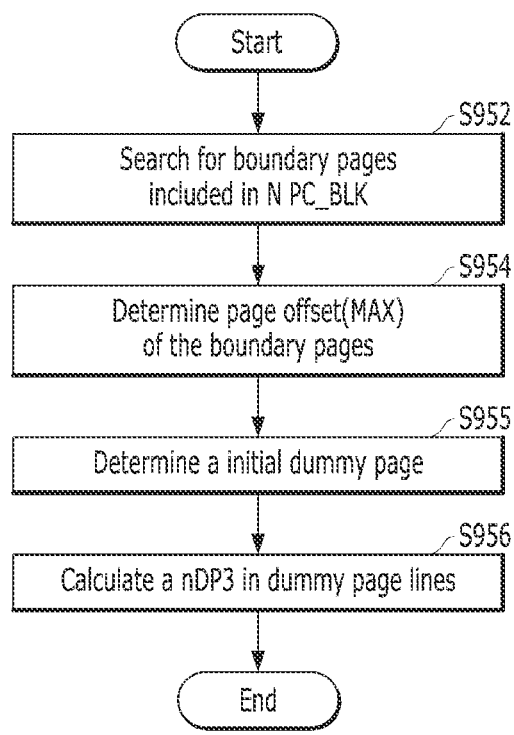

FIG. 13B illustrates an example of a method for calculating the number of dummy pages nDP3 included in a plurality of dummy page lines shared by a plurality of partially closed blocks according to another embodiment of the present invention.

The dummy page searcher 133 may search for a boundary page that is included in each of the partially closed blocks BLK0 and BLK1 to BLKN−1 based on block information BLK_INF received from the block information storage 131 in step S952.

The dummy page searcher 133 may determine the maximum page offset among the page offsets of the searched boundary pages, in step S954.

The dummy page searcher 133 may determine a page line having the boundary page, which has the maximum page offset, as the initial dummy page in step S955. Also, the dummy page searcher 133 may determine page lines whose page offsets are equal to or greater than the initial dummy page.

Accordingly, the dummy page calculator 135 may calculate the number nDP3 of the dummy pages included in all the dummy page lines in step S956. In this case, the dummy page calculator 135 may calculate the number of the dummy pages nDP3 that are included in all the dummy page lines by multiplying the number of the dummy page lines by the number N of the dummy pages included in one dummy page line.

Figure 13C:
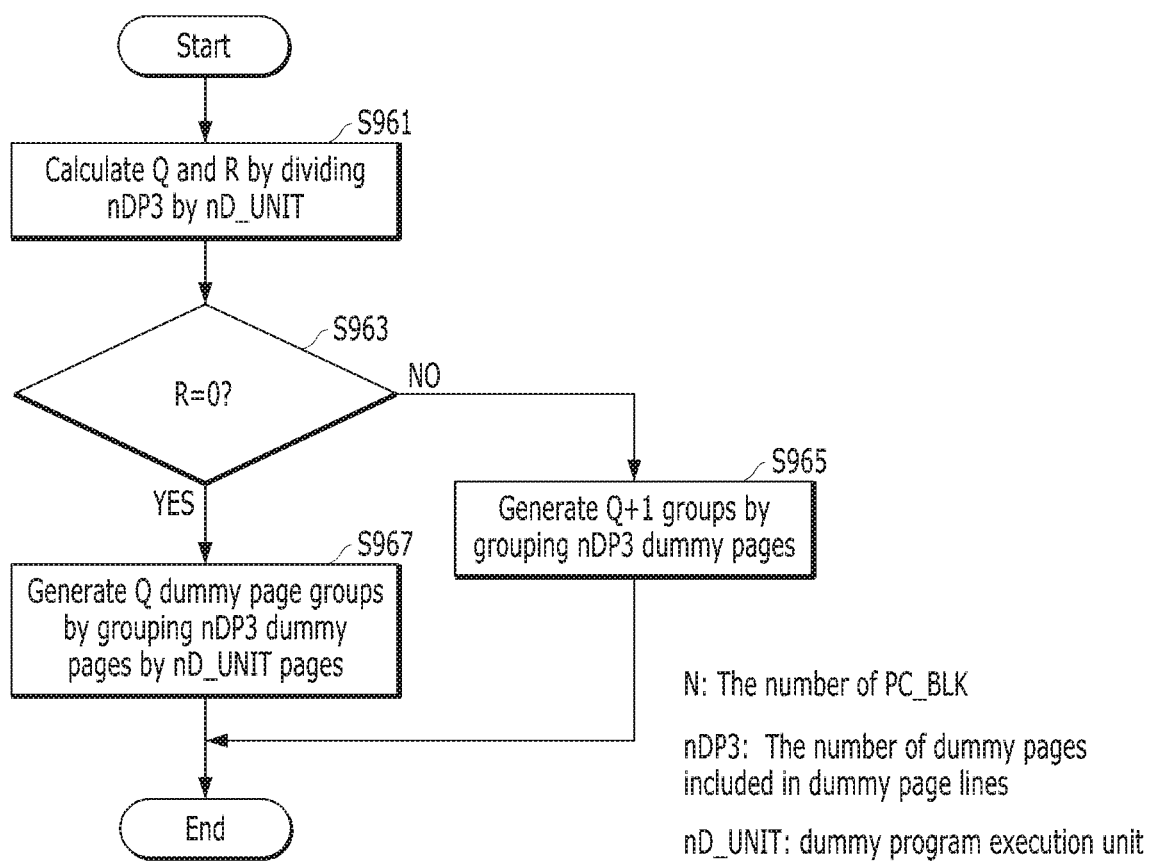

FIG. 13C illustrates an example of a method for generating a dummy page group according to another embodiment of the present invention.

Hereinafter, referring to FIG. 13C, a method for generating a dummy page group based on the number nDP3 of the dummy pages included in the dummy page lines calculated by the methods illustrated in FIGS. 13A and 13B according to another embodiment of the present invention will be described.

The dummy page group generator 137 of FIG. 8 may calculate the quotient Q and the remainder R in step S961 by dividing the number nDP3 of the dummy pages included in the dummy page lines shared by the N partially closed blocks by the dummy page count D_UNIT.

The dummy page group generator 137 may determine whether or not the remainder R calculated by the operation of the step S961 is 0 in step S963.

As a result of the determination in step S963, when the remainder R is 0 (YES in the step S963), the dummy page group generator 137 may generate Q dummy page groups in step S967 by grouping nDP3 dummy pages, because the number nDP3 of the dummy pages that are included in the dummy page lines is a multiple of the dummy page count D_UNIT.

As a result of the determination in step S963, when the remainder R is not 0 (NO in the step S963), the dummy page group generator 137 may generate Q+1 dummy page groups in step S965 by grouping nDP3 dummy pages. To be specific, the dummy page group generator 137 may generate Q dummy page groups by grouping nDP3 dummy pages by NDP3, and the dummy page group generator 137 may generate one dummy page group by grouping R dummy pages.

In the method for generating a dummy page group according to another embodiment of the present invention, the dummy page count D_UNIT may be a multiple of N, and preferably the dummy page count D_UNIT may be 2N or more for the efficiency of a dummy program operation that is performed on a page group basis.

Also, although not shown in the drawing, according to the embodiment of the present invention, before a dummy program operation is performed on a dummy page group, a preliminary dummy program operation may be sequentially performed on a page line basis on the page lines whose page offset is lower than the initial dummy page line and whose number nDP2 of the dummy pages is equal to or greater than 1 and less than N. Herein, the page lines whose number nDP2 of dummy pages is equal to or greater than 1 and less than N may have a smaller page offset than the page offset of the initial dummy page line.

Figure 14:
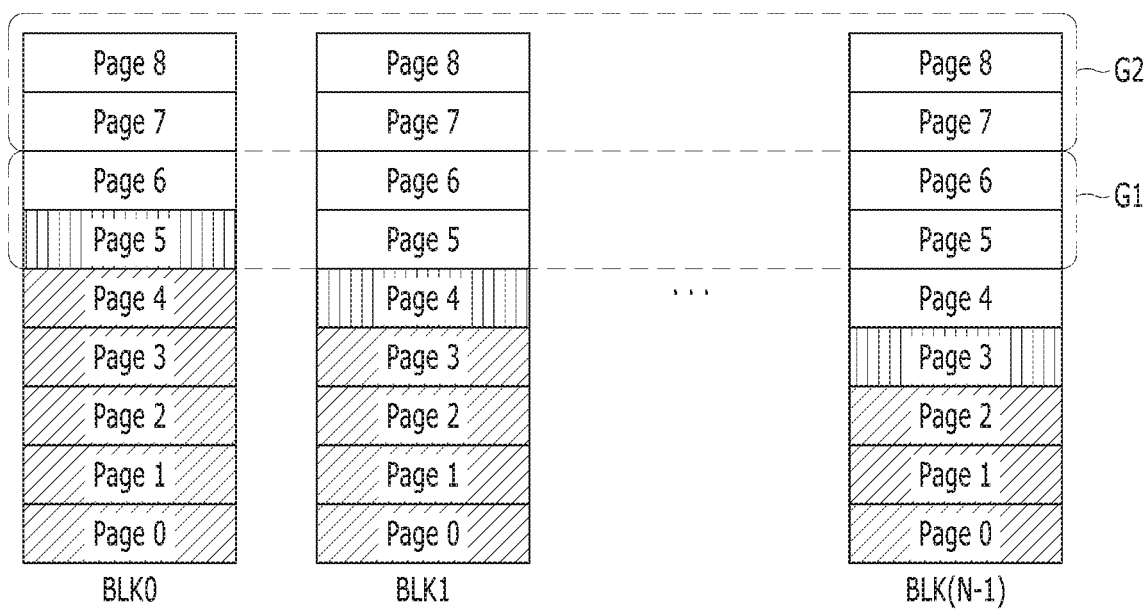

FIG. 14 illustrates dummy page groups generated according to the method of calculating the number of dummy pages included in a dummy page line of a plurality of partially closed blocks and a method for generating a dummy page group for each of the partially closed blocks illustrated in FIGS. 13A, 13B, and 13C.

Hereinafter, a method for calculating the number nDP3 of the dummy pages included in the N partially closed blocks BLK0 and BLK1 to BLKN−1 shown in FIG. 14 is described with reference to FIG. 13A, and a method for generating two dummy page groups G1 and G2 out of the dummy pages is described with reference to FIG. 13C.

In step S951, the dummy page searcher 133 may calculate the number of dummy pages nDP2 included in a first page line including pages (PAGE 0 of BLK0, PAGE 0 of BLK1, and PAGE 0 of BLKN−1) having a page offset P of 1 (P=1), which is the initial value. In step S953, the dummy page calculator 135 may determine whether or not nDP2 calculated in step S951 is equal to or greater than 0 and less than N. When it is determined in step S953 that nDP2 is 0, the dummy page calculator 135 may increase the page offset P (P=1) by 1 in step S957 and perform the operations of steps S951 and S953 on the second page line whose phase offset P is 2 (P=2).

In the return to step S951, the dummy page calculator 135 may calculate the number of the dummy pages nDP2 that are included in a second page line including pages whose page offset P is 2 (P=2) (PAGE 1 of BLK0, PAGE 1 of BLK1 to PAGE 1 of BLKN−1). The dummy page calculator 135 may determine whether the nDP2 in the second page line is equal to or greater than 0 and less than N in step S953. When it is determined in step S953 that nDP2 is 0, the dummy page calculator 135 may increase the page offset P (P=2) by 1 in step S957 and perform the operations of steps S951 and S953 again on a third page line having the page offset of 3 (P=3).

The operations of steps S951 and S953 may be performed until the initial dummy page line is found. Since the initial dummy page line of the N partially closed blocks BLK0, and BLK1 to BLKN−1 shown in FIG. 14 is a sixth page line whose page offset P is 6 (P=6), the operations of the steps S951 and S953 may be performed again by sequentially increasing the page offset P to 6.

In step S951, the dummy page calculator 135 may calculate the number of the dummy pages nDP2 included in the sixth page line including pages having a page offset of 6 (P=6) (PAGE 5 of BLK0, PAGE 5 of BLK1 to PAGE 5 of BLKN−1).

In step S953, the dummy page calculator 135 may determine whether or not nDP2 in the sixth page line whose page offset is 6 (P=6) is equal to or greater than 0 and less than N. When it is determined in step S953 that nDP2 is not equal to or greater than 0 and less than N but is N (NO in step S953), the dummy page calculator 135 may determine the sixth page line including the pages whose page offset is 6 (P=6) (PAGE 5 of BLK0 and PAGE 5 of BLK1 to PAGE 5 of BLKN−1) as the initial dummy page line in step S958.

In step S959, the dummy page calculator 135 may calculate the number of the dummy pages nDP3 (nDP3=4*nDP2=4N) included in four dummy page lines whose page offset P is equal to or greater than 6 (P=6 to 9).

In step S961, the dummy page group generator 137 may calculate the quotient Q (Q=2) and the remainder R (R=0) by dividing the number of the dummy pages nDP3 (nDP3=4N) included in the N partially closed blocks by 2N, which is the dummy page count D_UNIT.

In step S963, the dummy page group generator 137 may determine whether or not the remainder R calculated by the division operation of step S961 is 0.

When it is determined in step S963 that the remainder R is 0 (YES in step S933), two dummy page groups G1 and G2 may be generated by grouping 4N (nDP3=4N) dummy pages by 2N (D_UNIT=2N) in step S967.

According to the dummy programming method, a preliminary dummy program operation may be sequentially performed on a page line basis on the fourth and fifth page lines whose page offsets are lower than that of the sixth page line, which is the initial dummy page line in FIG. 14, and whose number of the dummy pages nDP2 is equal to or greater than 1 and less than N, before the dummy program operations of the first and second dummy page groups G1 and G2 are performed.

Hereinafter, a method for calculating the number of the dummy pages nDP3 included in the N partially closed blocks BLK0 and BLK1 to BLKN−1 shown in FIG. 14 is described with reference to FIG. 13B, and a method for generating two dummy page groups G1 and G2 out of the dummy pages is described with reference to FIG. 13C.

In FIG. 14, the number of the partially closed blocks BLK0 and BLK1 to BLKN−1 shown is N and the dummy page count D_UNIT is 2N. The dummy page line may be included in the N partially closed blocks and may be formed of N dummy pages having the same page offset P.

In step S952, the dummy page calculator 135 may search for N boundary pages included in the N partially closed blocks BLK0 to BLKN−1.

Referring to FIG. 14, a boundary page of the first partially closed block BLK0 may be the sixth page PAGE 5 having a page offset of 6 (P=6), a boundary page of the second partially closed block BLK1 may be the fifth page PAGE 4 having a page offset of 5 (P=5), and a boundary page of the $N^{th}$ partially closed block BLKN−1 may be the fourth page PAGE 3 having a page offset of 4 (P=4).

In step S954, the dummy page calculator 135 may calculate the page offset (P=6) of the boundary page (PAGE 5) included in the first partially closed block BLK0 as the maximum page offset among the page offsets of the N boundary pages found in the search.

In step S955, the dummy page calculator 135 may determine a page line including the page PAGE 5 having the maximum page offset of 6 (P=6) as the initial dummy page. Also, the dummy page calculator 135 may determine four page lines, which are the sixth to ninth page lines, having the maximum page offset of 6 (P=6) or more as dummy page lines.

In step S956, the dummy page calculator 135 may calculate the number of the dummy pages nDP3 included in these four page lines. In step S956, the dummy page calculator 135 may calculate "4*nDP2=4N", which is the number of the dummy pages nDP3 included in the dummy page lines, by multiplying the number of the dummy page lines, which is 4, by the number N of the dummy pages included in each of the dummy page lines.

In step S961, the dummy page group generator 137 may calculate the quotient Q (Q=2) and the remainder (R=0) by dividing the 4N dummy pages (nDP3=4N) included in the N partially closed blocks by 2N, which is the dummy page count D_UNIT.

In step S963, it may be determined whether or not the remainder R calculated by the division operation of the step S961 is 0. When it is determined in step S963 that the remainder R is 0 (YES in step S963), two dummy page groups G1 and G2 may be generated by grouping 4N dummy pages by 2N in step S967.

In the dummy programming method according to an embodiment of the present invention, a preliminary dummy program operation may be sequentially performed on a page line basis on the fourth and fifth page lines whose page offset is lower than the sixth page line, which is the initial dummy page line shown in FIG. 14, and whose number of dummy pages nDP2 is equal to or greater than 1 and less than N, before the dummy program operations of the first and second dummy page groups G1 and G2 are performed.

Figure 15:
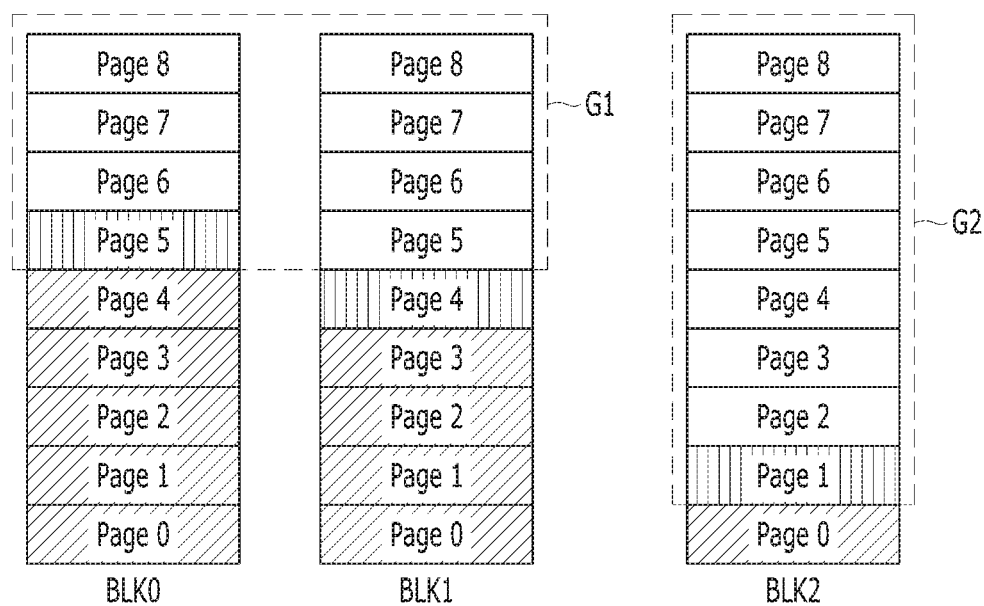
FIG. 15 is a diagram illustrating another example of a method for generating a dummy page group.

FIG. 15 is a block diagram conceptually illustrating partially closed blocks including a dummy page group which is generated by a dummy page group generation method according to yet another embodiment of the present invention. In particular, FIG. 15 is a block diagram illustrating a page grouping method in which aspects of the embodiment shown in FIGS. 11 and 12 are combined with aspects of the embodiment shown in FIGS. 13 and 14. As shown in FIG. 15, the dummy pages included in the first partially closed block BLK0 and the second partially closed block BLK1 may include the first dummy page group G1 that is generated by the page grouping method according to another embodiment shown in FIGS. 13 and 14. The dummy pages included in the third partially closed block BLK2 may include the second dummy page group G2 that is generated by the page grouping method according to the first embodiment shown in FIGS. 11 and 12.

Figures 16, 17:
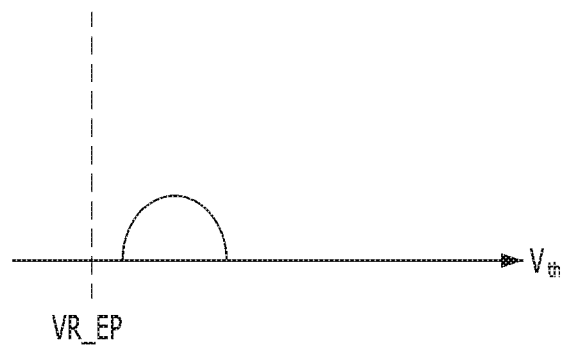
FIG. 16 is a diagram illustrating a threshold voltage distribution of the memory cells in the boundary page and the erase pages.
FIG. 17 is a diagram illustrating a threshold voltage distribution of the memory cells in the boundary page and the erase pages after the dummy program operation is performed.

FIG. 16 illustrates a threshold voltage distribution of the memory cells in the boundary page and the erase pages.

When the dummy program operation is performed on the boundary page and the erase pages, and a dummy program voltage is applied to the word-lines coupled thereto, the threshold voltages of the memory cells in the boundary page and the erase pages are greater than the erase page read voltage VR_EP.

FIG. 17 is a diagram illustrating another example of a method for generating a dummy page group. Referring to FIG. 17, when the dummy program operation on the boundary page and the erase pages is completed, the controller 130 performs an erase operation on the partially closed blocks. As described above, when the sudden power off occurs, deep-erase may be prevented by performing the dummy program operation only on the boundary page and the erase pages.

According to embodiments of the present invention, the memory system searches for a boundary page of a partially closed block at sudden power-off, checks an erase page, selectively performs a dummy program operation on the boundary page and the erase page, and performs the erase operation on the partially closed block. Therefore, deep-erase of the boundary page and the erase page included in the partially closed block is prevented. Thus, the lifetime of the partially closed block may be extended and the performance and reliability of a memory device may be improved.

According to embodiments of the present invention, the efficiency of the dummy program operation may be improved by controlling an execution unit of the dummy program operation and the number of times that the dummy program operation is performed.

According to embodiments of the present invention, the memory system 110 may control the time when a dummy program operation is performed and the number of times that a dummy program operation is performed, and independently perform a dummy program operation on a memory block included in a memory element in the idle state while a normal program operation is performed. By doing so, overhead applied on the memory system 110 may be reduced.

FIGS. 18 to 21 are diagrams schematically illustrating application examples of a data processing system, according to various embodiments of the present invention.

Figure 18:
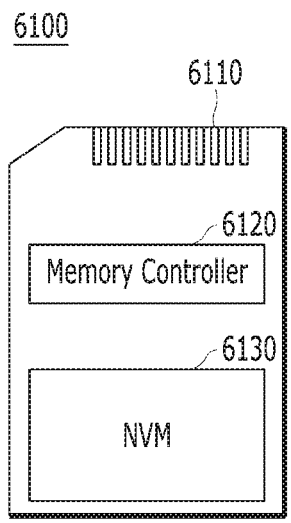
FIGS. 18 to 21 are diagrams schematically illustrating application examples of a data processing system, according to various embodiments of the present invention.

FIG. 18 is a diagram schematically illustrating an example of a data processing system including a memory system according to an embodiment of the present invention. Specifically, FIG. 18 schematically illustrates a memory card system.

Referring to FIG. 18, the memory card system 6100 may include a memory controller 6120, a memory device 6130 and a connector 6110.

More specifically, the memory controller 6120 may be connected to the memory device 6130, and may be configured to access the memory device 6130. The memory device 6130 may be embodied by a nonvolatile memory. By way of example but not limitation, the memory controller 6120 may be configured to control read, write, erase and background operations on the memory device 6130. The memory controller 6120 may be configured to provide an interface between the memory device 6130 and a host and/or drive firmware for controlling the memory device 6130. That is, the memory controller 6120 may correspond to the controller 130 in the memory system 110 described with reference to FIGS. 1 to 6, while the memory device 6130 may correspond to the memory device 150 described with reference to FIGS. 1 to 6.

Thus, the memory controller 6120 may include a RAM, a processor, a host interface, a memory interface and an error correction. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and/or Bluetooth. Thus, the memory system and the data processing system according to an embodiment may be applied to wired/wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and/or a spin torque transmit magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may form a solid state driver (SSD) by being integrated into a single semiconductor device. Also, the memory controller 6120 and the memory device 6130 may form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

According to embodiments of the present invention, the memory card system 6100 searches for a boundary page of a partially closed block at sudden power-off, checks an erase page, selectively performs a dummy program operation on the boundary page and the erase page, and performs the erase operation on the partially closed block. Therefore, deep-erase of the boundary page and the erase page in the partially closed block is prevented. Thus, the lifetime of the memory device 6130 may be extended and the performance and reliability of the memory device 6130 may be improved. According to embodiments of the present invention, the efficiency of the dummy program operation may be improved by controlling an execution unit of the dummy program operation and the number of times that the dummy program operation is performed.

According to embodiments of the present invention, the memory card system 6100 may control the time when a dummy program operation is performed and the number of times that a dummy program operation is performed, and independently perform a dummy program operation on a memory block in a memory element in the idle state while an operation according to a host request is performed. By doing so, overhead applied on the memory card system 6100 may be reduced.

Figure 19:
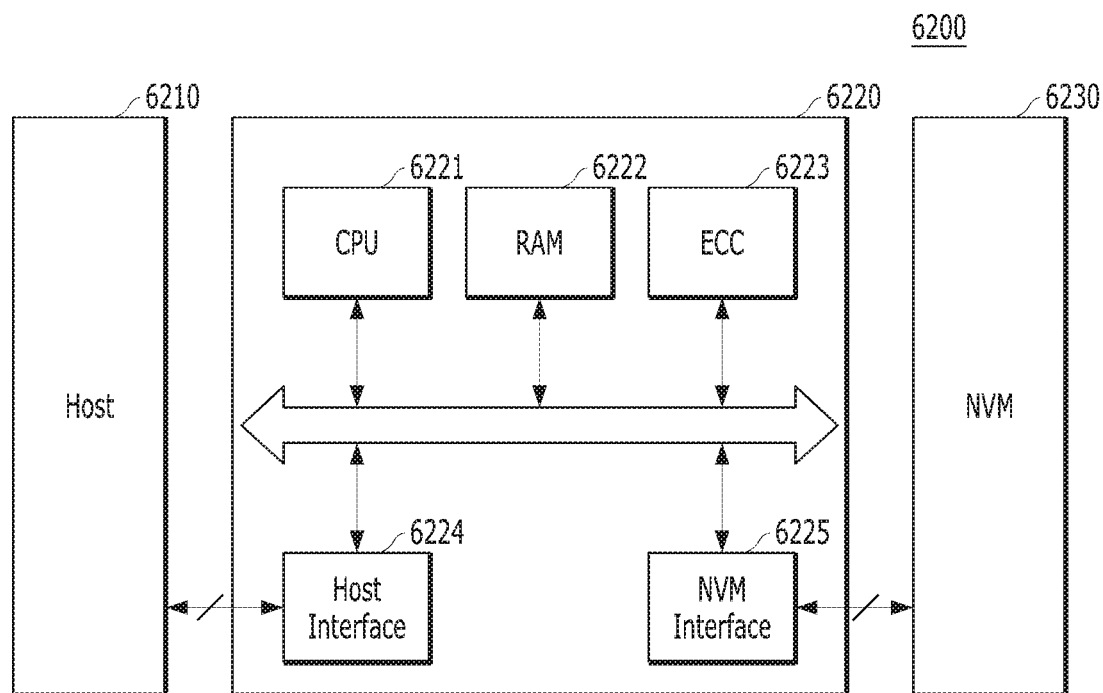

FIG. 19 is a diagram schematically illustrating another example of the data processing system including a memory system, according to an embodiment.

Referring to FIG. 19, the data processing system 6200 may include a memory device 6230 having one or more nonvolatile memories and a memory controller 6220 for controlling the memory device 6230. The data processing system 6200 illustrated in FIG. 19 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 6, and the memory controller 6220 may correspond to the controller 130 in the memory system 110 described in FIGS. 1 to 6.

The memory controller 6220 may control a read, write, or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device

6230. When the RAM 6222 is used as a cache memory, the RAM 6222 may assist the memory device 6230 to operate at high speed.

The ECC circuit 6223 may correspond to the ECC 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. in this case, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit to, or receive from, the host 6210 data or signals through the host interface 6224, and may transmit to, or receive from the memory device 6230 data or signals through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, e.g., the host 6210, or another external device, and then transmit/receive data to/from the external device. As the memory controller 6220 is configured to communicate with the external device through one or more of various communication protocols, the memory system and the data processing system according to an embodiment may be applied to wired/wireless electronic devices, particularly a mobile electronic device.

According to embodiments of the present invention, the data processing system 6200 searches for a boundary page of a partially closed block at sudden power-off, checks an erase page, selectively performs a dummy program operation on the boundary page and the erase page, and performs the erase operation on the partially closed block. Therefore, deep-erase of the boundary page and the erase page included in the partially closed block is prevented. Thus, the lifetime of the memory device 6230 may be extended and the performance and reliability of the memory device 6230 may be improved.

According to embodiments of the present invention, the efficiency of the dummy program operation may be improved by controlling an execution unit of the dummy program operation and the number of times that the dummy program operation is performed.

According to embodiments of the present invention, the data processing system 6200 may control the time when a dummy program operation is performed and the number of times that a dummy program operation is performed, and independently perform a dummy program operation on a memory block included in a memory element in the idle state while an operation according to a host request is performed. By doing so, overhead applied on the data processing system 6200 may be reduced.

Figure 20:
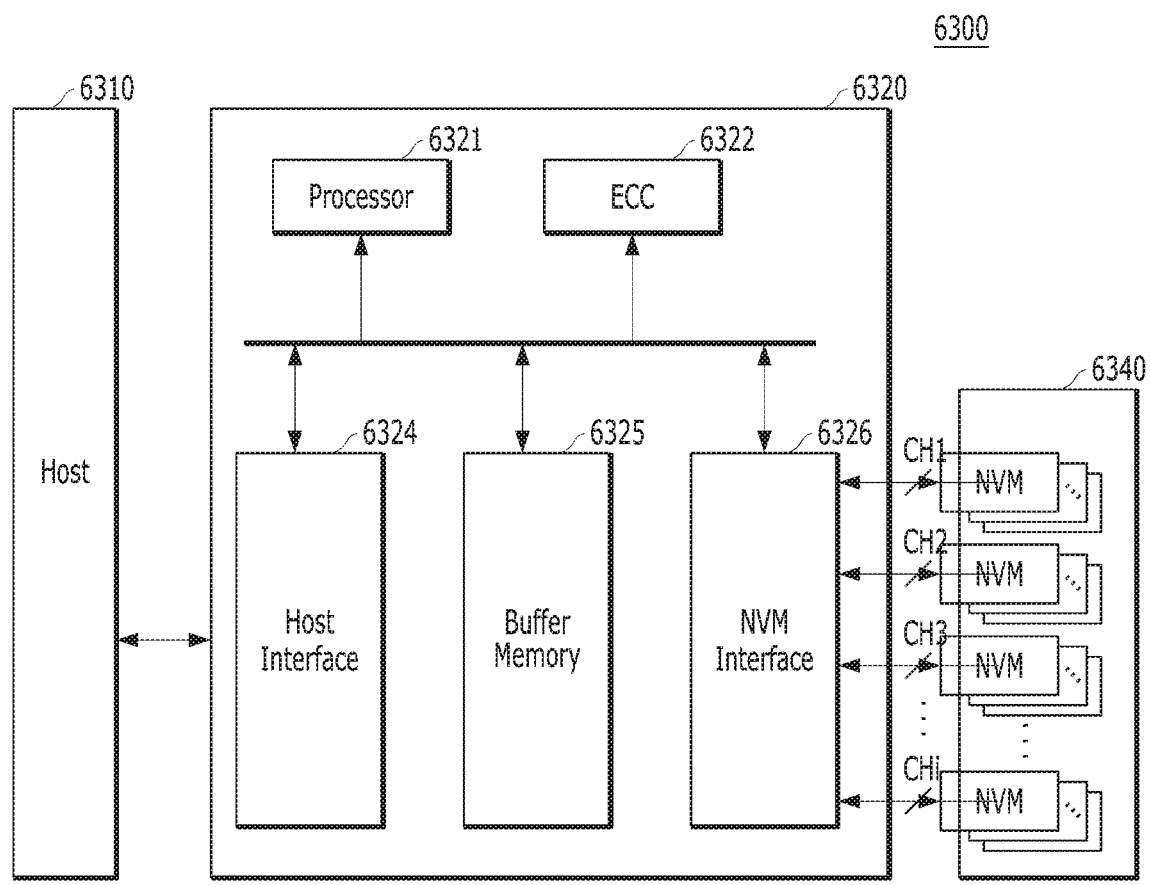

FIG. 20 is a diagram schematically illustrating another example of the data processing system including the memory system according to an embodiment. FIG. 20 schematically illustrates an SSD to which the memory system according to an embodiment is applied.

Referring to FIG. 20, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store metadata of the plurality of flash memories NVM, for example, map data including a mapping table. The buffer memory 6325 may be embodied by volatile memories such as a DRAM, an SDRAM, a DDR SDRAM, an LPDDR SDRAM and a GRAM or nonvolatile memories such as an FRAM, a ReRAM, a STT-MRAM and a PRAM. For the purpose of description, FIG. 20 illustrates that the buffer memory 6325 exists in the controller 6320, but the buffer memory 6325 may be located or arranged outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, i.e., RAID level information of the write command provided from the host 6310 in the SSDs 6300, and may output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

According to embodiments of the present invention, the SSD 6300 searches for a boundary page of a partially closed block at sudden power-off, checks an erase page, selectively performs a dummy program operation on the boundary page and the erase page, and performs the erase operation on the partially closed block. Therefore, deep-erase of the boundary page and the erase page included in the partially closed block is prevented. Thus, the lifetime of the memory device 6340 may be extended and the performance and reliability of the memory device 6340 may be improved.

According to embodiments of the present invention, the efficiency of the dummy program operation may be improved by controlling an execution unit of the dummy program operation and the number of times that the dummy program operation is performed.

According to embodiments of the present invention, the SSD 6300 may control the time when a dummy program operation is performed and the number of times that a dummy program operation is performed, and independently perform a dummy program operation on a memory block included in a memory element in the idle state while an operation according to a host request is performed. By doing so, overhead applied on the SSD 6300 may be reduced.

Figure 21:
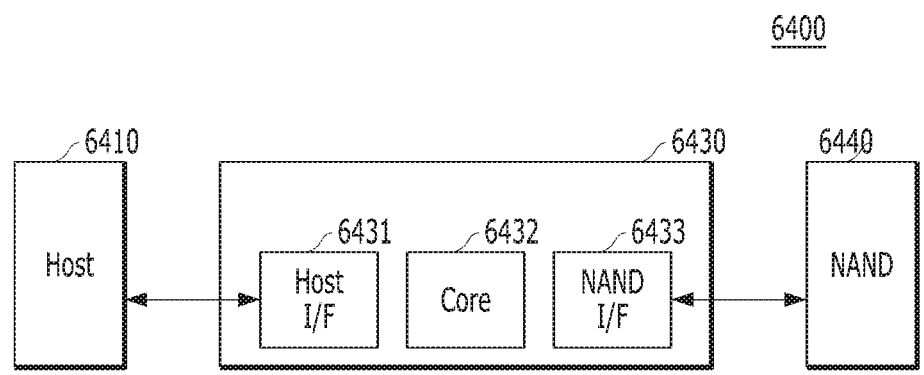

FIG. 21 is a diagram schematically illustrating another example of the data processing system including the memory system according to an embodiment. FIG. 21 schematically illustrates an embedded Multi-Media Card (eMMC) to which the memory system according to an embodiment is applied.

Referring to FIG. 21, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

According to embodiments of the present invention, the eMMC 6400 searches for a boundary page of a partially closed block at sudden power-off, checks an erase page, selectively performs a dummy program operation on the boundary page and the erase page, and performs the erase operation on the partially closed block. Therefore, deep-erase of the boundary page and the erase page included in the partially closed block is prevented. Thus, the lifetime of the memory device 6440 may be extended and the performance and reliability of the memory device 6440 may be improved.

According to embodiments of the present invention, the efficiency of the dummy program operation may be improved by controlling an execution unit of the dummy program operation and the number of times that the dummy program operation is performed.

According to the embodiments of the present invention, the eMMC 6400 may control the time when a dummy program operation is performed and the number of times that a dummy program operation is performed, and independently perform a dummy program operation on a memory block included in a memory element in the idle state while an operation according to a host request is performed. By doing so, overhead applied on the eMMC 6400 may be reduced.

While the present invention has been illustrated and described with respect to the specific embodiments, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A method for operating a memory system including a memory device having a plurality of memory elements and a controller coupled to the plurality of memory elements through a plurality of different channels, the method comprising:
calculating a number of dummy pages in partially closed blocks in the plurality of memory elements;
generating at least one dummy page group by grouping the dummy pages based on a dummy page count; and
performing a dummy program operation on the at least one dummy page group while a normal program operation is performed to an open block,
wherein the dummy pages include a boundary page and at least one erase page,
wherein the dummy program operation and the normal program operation are performed in an interleaving scheme through the plurality of different channels,
wherein the boundary page is positioned at a physical boundary between the at least one erase page and a normal program page in a partially closed block, and
wherein the normal program operation includes a user data program operation, a metadata program operation, a data flushing operation or a copy operation of valid data.

2. The method of claim 1, wherein the dummy program operation is performed in at least one of the plurality of memory elements that is in an idle state in which the normal program operation or a read operation is not being performed.

3. The method of claim 1, wherein the dummy program operation is performed in at least one of the memory elements coupled to a channel that is in an idle state in which data is not transmitted.

4. The method of claim 1, wherein the calculating the number of dummy pages is performed while the memory device is in an idle state.

5. The method of claim 1, wherein the dummy page count is determined based on at least one of the number of the dummy pages, a reduction rate of valid pages in the memory die, a number of free blocks among memory blocks in the memory device or a time taken for a normal program operation.

6. The method of claim 1, wherein the at least one dummy page group includes dummy pages that have same page offset and are in different partially closed blocks.

7. The method of claim 6, wherein the different partially closed blocks are coupled to the controller through the plurality of different channels.

8. The method of claim 1, wherein the at least one dummy page group includes the dummy pages that have different page offsets and are in the same partially closed block.

9. The method of claim 1, further comprising:
performing an erase operation on the partially closed blocks in which the dummy program operation is performed completely.

10. The method of claim 1, wherein the calculating the number of dummy pages is performed after a write request is received from a host.

11. The method of claim 1, wherein the calculating of the number of the dummy pages includes:
   searching for the boundary page in each of the partially closed blocks and at least one erase page which is physically consecutive to the boundary page found based on boundary page information of the partially closed blocks; and
   calculating the number of the boundary page and the at least one erase page.

12. A memory system comprising:
   a memory device including a plurality of memory elements each having a plurality of pages; and
   a controller coupled to the plurality of memory elements through a plurality of different channels,
   wherein the controller calculates a number of dummy pages in partially closed blocks in the plurality of memory elements and generates at least one dummy page group by grouping the dummy pages based on a dummy page count,
   wherein the controller performs a dummy program operation on the at least one dummy page group while a normal program operation is performed,
   wherein the dummy pages include a boundary page and at least one erase page,
   wherein the dummy program operation and the normal program operation are performed in an interleaving scheme through the plurality of different channels,
   wherein the boundary page is positioned at a physical boundary between the at least one erase page and a normal program page in a partially closed block, and
   wherein the normal program operation includes a user data program operation, a metadata program operation, a data flushing operation or a copy operation of valid data.

13. The memory system of claim 12, wherein the dummy program operation is performed in at least one of the plurality of memory elements that is in an idle state in which the normal program operation or a read operation is not being performed.

14. The memory system of claim 12, wherein the dummy program operation is performed in at least one of the memory elements coupled to a channel that is in an idle state in which data is not being transmitted.

15. The memory system of claim 12, wherein the controller generates the at least one dummy page group while the memory device is in an idle state.

16. The memory system of claim 12, wherein the controller generates the at least one dummy page group when a write request with a user data is received from a host.

17. The memory system of claim 12, wherein the dummy page count is determined based on at least one of the number of the dummy pages, a reduction rate of valid pages in the memory die, a number of free blocks among memory blocks in the memory device or a time taken for a normal program operation.

18. The memory system of claim 12, wherein the at least one dummy page group includes dummy pages that have the same page offset and are in different partially closed blocks.

19. The memory system of claim 17, wherein the different partially closed blocks are coupled to the controller through the plurality of different channels.

20. The memory system of claim 12, wherein the at least one dummy page group includes the dummy pages that have different page offsets and are in the same partially closed block.

21. The memory system of claim 12, wherein the controller performs an erase operation on the partially closed blocks in which the dummy program operation is performed completely.

22. The memory system of claim 12, wherein the controller calculates the number of dummy pages is performed when a write request is received from a host.

23. A method for operating a memory system including a memory device and a controller configured to control the memory device, the method comprising:
   identifying, in response to a specific event, a boundary page of a partially closed memory element in the memory device and at least one erase page that is adjacent to the boundary page based on boundary page information generated as a result of the specific event, the boundary page separating the at least one erase page adjacent thereto from a normal program page in the partially closed memory element;
   performing a dummy program operation on the boundary page and the at least one erase page included in the partially closed memory element in an idle state while a normal program operation is performed to the normal program page in an open memory element; and
   performing an erase operation on the partially closed memory element after performing the dummy program operation,
   wherein the dummy program operation and the normal program operation are performed in an interleaving scheme through different channels,
   wherein the normal program operation includes a user data program operation, a metadata program operation, a data flushing operation or a copy operation of valid data, and
   wherein the boundary page is positioned at a physical boundary between the at least one erase page and the normal program page.

* * * * *